United States Patent
Kushida et al.

(10) Patent No.: US 6,379,821 B2
(45) Date of Patent: Apr. 30, 2002

(54) MARTENSITIC STAINLESS STEEL WELDED PIPE

(75) Inventors: Takahiro Kushida, Hyogo; Tomohiko Omura, Osaka; Kunio Kondo, Hyogo; Kazuhiro Ogawa, Hyogo; Masahiko Hamada, Hyogo, all of (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 09/822,233

(22) Filed: Apr. 2, 2001

Related U.S. Application Data

(63) Continuation of application No. PCT/JP00/05296, filed on Aug. 7, 2000.

(30) Foreign Application Priority Data

Aug. 6, 1999 (JP) .......................................... 11-224671

(51) Int. Cl.$^7$ .............................................. B32B 15/18
(52) U.S. Cl. ....................... 428/685; 138/171; 138/177; 148/909; 420/34; 420/104; 428/682; 428/686
(58) Field of Search ................................ 428/682, 685, 428/686; 138/171, 177; 420/34, 104; 148/519, 529, 909

(56) References Cited

U.S. PATENT DOCUMENTS 6,129,999 A * 10/2000 Ueda et al. .................. 428/685
6,220,306 B1 * 4/2001 Omura et al. ............... 138/177

FOREIGN PATENT DOCUMENTS

| JP | 6-299233 A | * | 10/1994 | ............ C21D/6/00 |
| JP | 9-29429 A | * | 2/1997 | ............ B23K/9/00 |
| JP | 10060599 | | 3/1998 | |
| JP | 10146691 | | 6/1998 | |
| JP | 11080881 | | 3/1999 | |
| JP | 2000008144 | | 1/2000 | |
| JP | 2000080442 | | 3/2000 | |

OTHER PUBLICATIONS

Hillenbrand, et al., Manufacture of Longitudinally Welded Large–Diameter Pipe from Fully Martensitic Low–Carbon 13% Chromium Steels, Supermartensitic Stainless Steels 99, pp. 134–140; No date given.

* cited by examiner

Primary Examiner—Robert R. Koehler
(74) Attorney, Agent, or Firm—Clark & Brody

(57) ABSTRACT

This invention relates to a large-diameter, thick-wall martensitic stainless steel welded pipe. For this welded pipe, the size of the raised weld bead portion on the inside surface is restricted to be small based on a conditional formula derived by considering the bead width and height and the yield strength of the base metal and of the weld metal. As a result, the base metal portion and pipe inside surface seam portion of this welded pipe are superior in corrosion resistance, in particular stress corrosion cracking resistance (SCC resistance). The sulfide stress corrosion resistance (sour gas resistance) and carbon dioxide corrosion resistance can be further improved by selecting the chemical compositions. This welded pipe is very well suited for use as a pipe for a pipeline for conveying a crude oil and a natural gas with no dehydration treatment, which is highly corrosive to metals.

14 Claims, 2 Drawing Sheets

$$Y = (\sigma / E + 0.002)(A^2 - 4B^2) / 12t$$

$\sigma$: bending stress

E: Young's modulus

MARTENSITIC STAINLESS STEEL WELDED PIPE

This application is a continuation of International Application PCT/JP00/05296 filed on Aug. 7, 2000, and this PCT application and its Japanese priority application JP11-224671 are both hereby incorporated by reference in their entirety.

FIELD OF THE INVENTION

This invention relates to a martensitic stainless steel welded pipe excellent in corrosion resistance, in particular in stress corrosion cracking resistance. More particularly, it relates to a martensitic stainless steel large-diameter and thick-wall welded pipe exceeding 20 inches in outside diameter and exceeding 0.5 inch in wall thickness, which is used in a pipeline, in particular a trunk line, for conveying a fluid such as oil or natural gas readily corroding metals.

BACKGROUND OF THE INVENTION

Large-diameter, thick-wall stainless steel pipes exceeding 20 inches in outside diameter and 0.5 inch in wall thickness are widely used in pipelines, in particular trunk lines, for conveying oils or natural gases which readily cause corrosion of metals.

Such large-diameter, thick-wall pipes are generally produced by a process which comprises forming a thick plate or hot strip into an open pipe or spiral form by bending and then welding the joining portions together. The steel pipes produced by such a process are called UO pipes or spiral pipes.

UO pipes are produced by a forming process comprising the steps referred to by the alphabetic letters (U and O) indicative of the name given thereto. In this process, a thick plate is formed into an open pipe form bent by using a U press, then the side edges are joined to each other to form a pipe shape by means of an O press and the joining portions are welded together.

Spiral pipes are produced by forming a hot strip into a pipe shape by spirally bending the hot strip in succession and then welding the joining portions together, side edge to side edge of the strip.

Processes other than those mentioned above are also available for the production of large-diameter, thick-wall pipes. For example, there is a process which comprises forming a thick plate into a pipe-like shape using a 3-roll type forming machine called roll bender and then seam-welding the side edge to side edge in order to join portions of the thick plate together.

In producing these large-diameter, thick-wall pipes, the submerged arc welding method (hereinafter referred to as "SAW method") is widely used. In producing large-diameter, thick-wall pipes by welding, one-layer welding is generally carried out from each of inside and outside of the pipe. Further, when the wall of the material is thick, multi pass (at least three) layer welding, in which two or more bead layers are formed from one or both sides, may be conducted in some instances.

Heretofore, in producing large-diameter, thick-wall welded pipes to be used in conveying fluids, such as oils and natural gases, readily causing corrosion of metals, steel plates made of carbon steel or low alloy steel containing at most about 1% by mass of Cr have been used as the base metals together with welding materials. The reason why large-diameter, thick-wall welded pipes made of carbon steel, which is inferior in corrosion resistance, have been used is that carbon steel is economically more advantageous. However, carbon steel is poor in corrosion resistance. Therefore, for pipelines constituted of welded pipes made of carbon steel, it has been a common practice to subject the crude oil or natural ngas obtained from an oil well to dehydration to thereby reduce the corrosiveness of the fluid.

However, the cost of construction of the dehydration equipment and the platform for the installation thereof is high. Therefore, the use of a more corrosion-resistant material has been begun for the production of pipes for pipelines while omitting the dehydration equipment. The material having higher corrosion resistance includes stainless steel.

In this case, neither dehydration equipment nor platform therefor is required at exploration locations and this fact is very advantageous to the exploration of small-scale oil or gas wells, for example horizontal wells, which cannot have been drilled. Specifically, it is an advantage that crude oils can be conveyed through such pipelines to an existing platform and collectively treated there for dehydration.

In high-latitude districts at north latitude 70° or higher where future exploration is expected, for example oil wells in the North Sea, the platform construction itself is difficult from the viewpoint of waves on the sea. In that case, it is necessary to transport crude oils through pipelines without dehydration treatment.

With such background, large-diameter, thick-wall welded pipes enabling the omission of dehydration treatment are more and more desired for conveying fluids readily corrosive against metals.

Some stainless steels which are highly corrosion-resistant and suitable for conveying such fluids as mentioned above, and seamless pipes or electric resistance welded pipes or laser welded pipes made thereof with a relatively small diameter and a relatively thin wall, have been proposed. As for large-diameter, thick-wall welded pipes made of stainless steel, welded pipes and base metals therefor are disclosed in JP Kokai H10-60599 and JP Kokai H12-8144, for instance.

For the above application, martensitic stainless steel containing 9–13% by mass of Cr are used from the economical viewpoint. This is because martensitic stainless steel has, in addition to the economical feature, sufficient corrosion resistance under such circumstances as mentioned above, and is excellent in hot workability and, therefore, can readily be made into thick plates or hot-rolled plates, which are materials for the production of welded pipes.

It has been considered that these martensitic stainless steels used for base metals and the weld metals of seam weld portions are excellent in stress corrosion cracking resistance (hereinafter referred to as "SCC resistance"), carbon dioxide gas corrosion resistance (hereinafter referred to as "$CO_2$ resistance") and sulfide stress corrosion resistance (hereinafter referred to as "SSC resistance" or "sour gas resistance").

However, it has been revealed that when welded pipes made of martensitic stainless steel are used in a pipeline for conveying a corrosive fluid without dehydration, stress corrosion cracking (hereinafter referred to as "SCC") tends to occur at the weld portion of the pipe inside surface. In particular, with large-diameter, thick-wall welded pipes produced by the SAW method without cutting off the weld bead on the pipe inside and outside surfaces, the tendency toward occurrence of SCC is significant. Furthermore, it has become apparent that even if the pipes have SCC resistance, the base metal and weld metal may be poor in sour gas resistance and the weld metal may be high in weld hot cracking susceptibility in some instances.

SUMMARY OF THE INVENTION

The object of the present invention is to provide a large-diameter, thick-wall martensitic stainless steel welded pipe excellent in corrosion resistance, in particular stress corrosion cracking resistance (SCC resistance), at the base metal portion and the seam weld portion of pipe inside surface and, further, excellent in sulfide stress corrosion resistance (sour gas resistance) and carbon dioxide gas corrosion resistance ($CO_2$ resistance).

The stainless steel welded pipe of the invention is composed of a base metal which is a stainless steel containing not more than 0.05% by mass of C and 9–20% by mass of Cr and having metallurgical microstructures comprising a full martensite phase or a martensite phase as the main constituent with a ferrite phase contained therein, and a seam weld metal which is a stainless steel containing not more than 0.1% by mass of C and 7–20% by mass of Cr and having metallurgical microstructures comprising a martensite phase as the main constituent with an austenite phase contained therein. Further, the seam weld bead on the inside surface of the welded pipe of the invention satisfies the following relation (1):

$$L \leq 0.2 \times W \tag{1}$$

where

L: the length of the portions of the seam weld bead showing a value of h which exceeds 1.25 as calculated by the expression (2) shown below:

$$h = \{1 + (2 \times H/W)\} \times (YS_{B100}/YS_{w100}) \tag{2}$$

where

H: the height of the bead from the pipe inside surface (mm),

W: the width of the bead (mm), $YS_{B100}$: the yield strength of the base metal at 100° C. (MPa), $YS_{w100}$: the yield strength of the weld metal at 100° C. (MPa).

As for the metallugical microstructures of the base metal and weld metal, those of the base metal are desirably constituted of 55–90% martensite phase and 10–45% ferrite phase and those of the weld metal are desirably constituted of 70–95% martensite phase and 5–30% austenite phase, on the volume % basis.

The contents of chemical components other than C and Cr of the base metal and of the weld metal of the seam weld portion of the welded pipe of the invention are desirably within the respective ranges shown below:

For the base metal, on the mass % basis:

| | |
|---|---|
| Si: 0.01–1%, | sol. Al: 0.001–0.1%, |
| Mn: 0.05–2%, | V: 0–0.5%, |
| Ni: 0–9%, | Zr: 0–0.5%, |
| Mo: 0–5%, | Ca: 0–0.05%, |
| W: 0–6%, | Mg: 0–0.05%, |
| Cu: 0–5%, | Ti: not more than 0.1%, |
| | Balance: Fe and impurities; |

For the weld metal, on the mass % basis:

| | |
|---|---|
| Si: 0.01–1%, | sol. Al: 0.001–0.1%, |
| Mn: 0.05–2%, | V: 0–0.3%, |
| Ni: 0–10%, | Zr: 0–0.3%, |
| Mo: 0–5%, | Ca: 0–0.03%, |
| W: 0–3%, | Mg: 0–0.03%, |
| Cu: 0–3%, | Ti: not more than 0.1%, |
| | Balance: Fe and impurities. |

For both the base metal and weld metal, the contents of P, S and O (oxygen) among the impurities are desirably as follows: P: not more than 0.025%, S: not more than 0.01% and O: not more than 0.01%, while the content of N is desirably not more than 0.02% for the base metal and not more than 0.05% for the weld metal.

The welded pipe mentioned above is a basic welded pipe of the present invention, and the welded pipe of the invention which satisfied the above conditions is excellent in SCC resistance, in particular. The base metal used for pipe production may be the one as hot rolled. Further, this pipe shows sufficient SCC resistance and $CO_2$ resistance even when the heat treatment of the heat affected zone of the base metal and of the weld metal portion is omitted after welding.

The contents of Cr, Ni and Ti in the base metal of the basic welded pipe of the invention desirably fall within the respective ranges given below and further satisfy the relations (3) and (4) given below. In this case, even when the base metal is as hot rolled, it is excellent not only in SCC resistance but also in sour gas resistance and, even when the heat treatment of the weld portion after welding is omitted, these resistances are satisfactory.

| | |
|---|---|
| Cr: 11–20%, | Ti: not more than 0.05%, |
| Ni: 3–7%, | |

$$Cr + 1.5Mo - Ni - 0.4Cu - 14 \geq 0 \tag{3}$$

$$Cr + 1.5Mo - 2Ni - 0.8Cu - 12.5 \leq 0 \tag{4}$$

For the above basic welded pipe, it is also desirable that the Cr, Ni, Mo and Ti contents of the base metal as shown below are combined with the Cr, Ni, Mo and Ti contents of the weld metal as shown below and that the chemical composition of the weld metal satisfy the relations (5) and (6) given below. In this case, even when the heat treatment of the weld portion after welding is omitted, the base metal and weld metal are excellent in toughness and strength and the weld metal portion is excellent with respect to sour gas resistance and weld hot cracking susceptibility.

| Base metal: | |
|---|---|
| Cr: 15–20%, | Mo: 1.5–4%, |
| Ni: 4–7%, | Ti: not more than 0.015%; |
| Weld metal: | |
| Cr: 11–18%, | Mo: 1.5–4%, |
| Ni: 5–10%, | W: 0–4%, |
| Ti: not more than 0.03%, | |

$$-1 \leq Cr+Mo-1.7Ni \leq 13-220 \times O \text{ (oxygen)} \quad (5)$$

$$25 \leq Cr+Mo+1.8Ni \leq 30 \quad (6)$$

In addition to the welded pipe mentioned above, the basic welded pipe according to the invention, when the base metal and seam weld metal have the chemical compositions respectively given below on the mass % basis, shows the highest SCC resistance.

| Base metal: | |
|---|---|
| Si: not more than 0.5%, | Ti: not more than 0.1%, |
| Mn: not more than 1%, | Cu: 0–3%, |
| Cr: 9–17%, | V: 0–0.3%, |
| Ni: 0–9%, | Ca: 0–0.01%, |
| W: 0–1%, | Balance: Fe and impurities; |
| Weld metal: | |
| C: not more than 0.05%, | Ti: not more than 0.1%, |
| Si: not more than 0.5%, | Cu: 0–3%, |
| Mn: not more than 1%, | V: 0–0.2%, |
| Cr: 9–20%, | Ca: 0–0.01%, |
| Ni: 0–9%, | B: 0–0.01%, |
| W: 0–3%, | Balance: Fe and impurities. |

The above-mentioned welded pipe of the invention is most suited for use as a pipe for a pipeline for conveying crude oil or natural gas without dehydration.

The invention is directed to a large-diameter, thick-wall welded pipe and the term "large diameter" means not less than 20 inches (508 mm) and the term "thick wall" means not less than about 0.5 inch (12.7 mm). The term "martensite phase as the main constituent" means that the martensite phase proportion exceeds 50% by volume.

BRIEF DESCRIPTION OF THE DRAWINGS

FIG. 2A is a sectional view of a jig for providing a bending stress and FIG. 2B is a drawing illustrating a state of a 4-point bending stress being imposed.

DETAILED DESCRIPTION OF THE INVENTION

As mentioned above, crude oils and natural gases, when the treatment for dehydration thereof is omitted, may cause corrosion of metals. When large-diameter, thick-wall martensitic stainless steel welded pipes produced by the SAW method are applied to pipelines for conveying such fluids, stress corrosion cracking (SCC) generally tends to occur on the seam weld on the pipe inside surface.

The present inventors revealed that the above SCC occurs mainly at the weld bead toe. They elucidated the cause thereof and have now completed the present invention.

Figure 1:
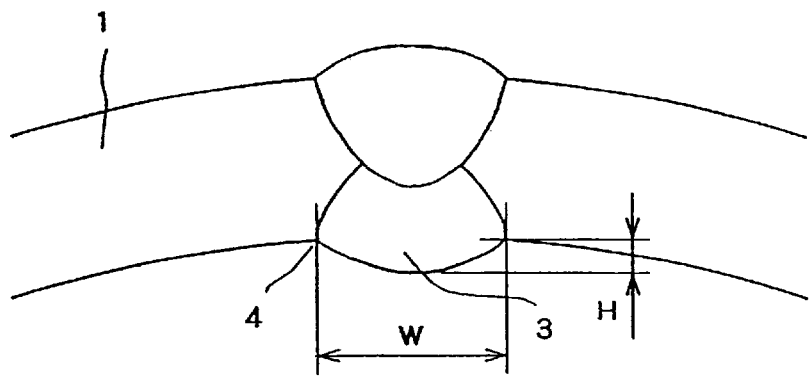
FIG. 1 is a schematic drawing illustrating the sectional structure of the seam of an ordinary large-diameter, thick-wall welded pipe.

FIG. 1 is a schematic drawing illustrating the sectional structure of the seam weld of an ordinary large-diameter, thick-wall welded pipe.

For the welded pipe 1 according to the invention, the size and number of the convexes of the weld on the pipe inside surface are restricted by considering the width and height of the weld bead 3 on the pipe inside surface and the yield strength of the base metal and of the weld metal at the temperature 100° C. As a result, the stress concentration at the weld bead toe 4 caused by the shape of the weld bead is suppressed and it becomes possible to prevent the occurrence of cracking caused by the difference in strength between the base metal and weld metal at high temperatures up to 100° C. In particular, the synergy effect in preventing the SCC resulting from those two effects is significant. Therefore, the welded pipe of the invention exhibits good SCC resistance even in fluids containing high concentrations of chlorides and $CO_2$ at high temperatures up to about 100° C.

The reason why SCC tends to occur at the toe 4 of the weld bead 3 on the pipe inside surface may be mentioned more specifically as follows.

In producing martensitic stainless steel welded pipes, the weld material (welding wire) generally used is a duplex stainless steel containing not less than 22% by mass of Cr and comprising a ferrite phase and an austenite phase or a super duplex stainless steel containing not less than 25% by mass of Cr. Of the weld materials mentioned above, the duplex stainless steel is superior in corrosion resistance to the base metal while the super duplex stainless steel is superior in corrosion resistance and strength to the base metal. When, on the other hand, a martensitic weld material having the same component series as the base metal is used, the weld material is selected among those having a chemical composition allowing the formation of an austenite phase in the weld metal. The reason is that since martensitic stainless steel is high in weld cold cracking susceptibility, the cold cracking should be inhibited by forming an austenite phase. In cases where a ferrite phase is present in the weld metal, weld hot cracking tends to occur readily and therefore the metallurgical microstructures should comprise two phases, namely a martensite phase and an austenite phase.

The weld metal having dual phase microstructure containing austenite phase shows more markable decreases in strength, in particular in yield strength, at high temperatures up to about 100° C. as compared with base metals having substantially single-phase martensite microstructures. Therefore, the yield strength of the weld metal is lower than that of the base metal in a high temperature service environment. In particular when used in a pipeline, the pipe undergoes hoop stress due to tension during use and, therefore, greater strains are imposed on the weld metal inferior in yield strength than on the base metal. The reason why SCC tends to occur at the weld bead toe is that the tensile stress and the stress concentration in the weld bead overlap with each other, which result in an excessive increase in the strain on the weld metal side of the weld bead toe. Where the welded pipe of the invention is concerned, the strain at the weld bead toe on the pipe inside surface is prevented from occurring by the means described below, hence SCC hardly occurs.

In the following, the welded pipe of the invention is described more specifically. The representation by % of the content of each chemical component means % by mass.

Shape of the Weld Bead on the Pipe Inside Surface:

According to the invention, the height index h of the weld bead on the pipe inside surface is defined by the following equation (2):

$$h = \{1 + (2 \times H/W)\} \times (YS_{B100}/YS_{w100}) \qquad (2)$$

In formula (2), H (mm) represents the height of the weld bead 3 from the pipe inside surface, W (mm) the width of the bead, $YS_{B100}$ (MPa) the yield strength of the base metal at 100° C. and $YS_{w100}$ (MPa) the yield strength of the weld metal at 100° C.

For the welded pipe of the invention, the value of the index h defined by the above formula (2) which is equal to 1.25 is taken as a standard index value. And, the length L, in the weld bead direction, of those convexes of the welded pipe whose h exceeds 1.25 is determined. L should satisfy the following relation (1):

$$L \leq 0.2 \times W \qquad (1)$$

The reason why SCC resistance evaluation is made based on the combination of h=1.25 and relation (1) is that this combination enables the most accurate appreciation of the SCC resistance.

In the case of spiral welded pipes, the term "in the weld bead direction" as used herein means the direction of the fusion line of the spiral seam. The above standard is very effective for evaluating, for SCC resistance, welded pipes particularly intended for conveying high-temperature fluids untreated for dehydration, such as crude oils rich in chlorides and containing carbon dioxide gas.

Referring to the above formula (2), the yield strength values at 100° C. for the base metal and weld metal are employed because, in those pipelines where the welded pipe of the invention is mainly used, the pipe inside temperature is generally at most about 100° C.

Metallugical Microstructures of the Base Metal and Weld Metal:

The metallugical microstructures of the base metal should consist mainly of a martensite phase containing a ferrite phase. Although the base metal may comprise a full martensite phase, a thick plate or hot-rolled plate with a single phase, which is the material for a welded pipe, is excessively high in strength, hence the conditions of use thereof are restricted; for example, it is less workable and the welded pipe as welded condition can hardly be used without heat treatment after production. Therefore, for obtaining an appropriate level of strength, the metallurgical microstructures of the base metal should be such that the martensite phase proportion exceeds 50% by volume and a ferrite phase is contained therein. The ferrite phase proportion may be 0%. The martensite phase volume percentage in the metallurgical microstructures is desirably 55–90%. The ferrite phase accounts for the remainder and the volume percentage thereof is desirably 10–45%.

The strength of the base metal as hot-rolled or as welded for pipe production is desirably equivalent to the X-80 grade of strength (551 to 689 MPa in yield strength) as defined in the relevant API standard. For attaining such strength, it is necessary that the microstructures contain a soft ferrite phase, namely the δ-ferrite phase, as a second phase. When the martensite phase proportion exceeds 90% by volume, the strength becomes excessively high and local deformation may occur in the weld portions during the construction of a pipeline. It is therefore desirable that the martensite phase account for not more than 90% by volume, namely the ferrite phase account for not less than 10%, so as to suppress the increase in strength. When, on the other hand, the martensite phase proportion is less than 55% by volume, a yield strength corresponding to the X-80 grade may not be secured in some instances. Therefore, it is desirable that the martensite phase volume percentage is 55–90%.

The volume ratio between the martensite phase and ferrite phase in the metallurgical microstructures can be determined by the point counting method. According to this method, microscopic photographs of the metallurgical microstructures at a magnification of 1,000 (7.3 cm×9.5 cm) are taken in 5 fields and further 4-fold enlargements thereof are printed. Then, unit lines are drawn on these photographs at 5-mm pitches and all the grids are examined while giving 1 point when a grid is within a martensite phase, 0 (zero) point when it is within a ferrite phase and 0.5 point when it is on the boundary between a martensite phase and a ferrite phase. Further, the total number of grids is calculated and the proportion of each phase is determined by dividing the score obtained in the above manner by that total number. This value represents the volume proportion of the relevant phase.

The metallurgical microstructures of the weld metal mainly comprise a martensite phase and contains an austenite phase. The microstructures should contain an austenite phase so that the strength, toughness, cold workability and weld hot cracking resistance of the weld metal portion can be secured. The austenite phase proportion is desirably 5–30% by volume, with the martensite phase proportion thus being 70–95% by volume. In particular when the fusion welding method, which tends to increase an O (oxygen) content in the weld metal portion, is used, the microstructure containing austenite phase is effective for securing toughness.

The austenite phase volume percentage (%) in the martensitic microstructures can be determined by the following method. For a pipe or plate, the intensity ratio of the austenite {220} diffraction pattern to the martensite phase {211} diffraction pattern is determined for each of three sections, namely a section in the direction of rolling, a section perpendicular to the direction of rolling and a section parallel to the surface, by the X ray diffraction method using the Co-Kα ray as the primary X ray. The austenite phase volume percentages are then calculated based on the measured values for the three sections and the mean values of the results is calculated.

Since, however, the martensite phase and austenite phase differ in diffraction pattern intensity, hence errors may occurre due to the differences in characteristics from apparatus to apparatus, it is necessary to make intensity corrections using a standard sample composed of marsensitic stainless steel and austenitic stainless steel blended in a predetermined phase ratio.

Chemical Compositions of the Base Metal and Weld Metal:

C: When the C content is high, both the base metal and weld metal increase hardness. When the hardness is high, the SCC resistance and sour gas resistance decrease, so that a low C content is desirable. For the base metal, in particular, the C content should be as low as possible and, when the C content is over 0.05%, the hardening in the welding heat affected zone becomes significant. In that case, the difference in yield strength between the base metal and weld metal portion increases and strains tend to be concentrated on the weld metal side at the boundary between the weld metal portion and welding heat affected zone at the weld bead toe. When such a welded pipe is applied for conveying a high temperature fluid not treated for dehydration but containing chlorides in large amounts under a carbon dioxide gas environment, it is apt to undergo stress corrosion cracking. Further, in an environment containing a trace amount of hydrogen sulfide, its sour gas resistance decreases markedly.

Therefore, the C content of the base metal is determined to be not more than 0.05%. As for the weld metal, the upper limit of the C content is desirably higher as compared with the base metal so that the weld metal can be higher in strength than the base metal; thus, the upper limit of the C content is set to 0.1%. Desirably, the C content is not more than 0.03% for the base metal and is not more than 0.05% for the weld metal.

Cr: Cr is an element improving the corrosion resistance, in particular the $CO_2$ resistance. When the Cr content of the base metal is less than 9% and that of the weld metal is less than 7%, the $CO_2$ resistance is not sufficient for the pipe to be used in conveying a carbon dioxide-containing fluid readily corroding metals, for example natural gas or crude oil with no dehydration treatment. Therefore, the lower limit of the Cr content is set to 9% for the base metal and 7% for the weld metal.

The upper limit of the Cr content is set to 20% for both the base metal and weld metal. When the Cr content of the base metal is over 20%, the martensite transformation temperature (Ms point) lowers, hence it is difficult to obtain metallurgical microstructures mainly comprising a martensite phase. In particular when a plate as hot rolled is used as the base metal for the production of a welded pipe, it becomes difficult to secure the desirable lower limit, namely 55% by volume, to the martensite phase proportion.

When the Cr content of the weld metal is over 20%, ferrite phases tend to be formed. In that case, the metallurgical microstructures of the weld metal portion will not become dual phase microstructures mainly comprising a martensite phase and containing an austenite phase.

Therefore, the Cr content of the base metal should be 9–20% and that of the weld metal 7–20%. Since the $CO_2$ resistance is more improved as the Cr content is higher, a desirable Cr content range is 11–20%, more desirably 15–20%, for the base metal and 11–18%, more desirably 11–15%, for the weld metal.

The Cr content exerts important influences also on the sour gas resistance of the base metal and weld metal and on the weld hot cracking susceptibility of the weld metal. These corrosion resistances are also influenced by the contents of other elements, for example Ni, which are austenite phase forming elements. Therefore, it is recommended that the Cr content is selected considering the contents of such elements, as mentioned later.

The elements mentioned below are elements which may be contained in the base metal when necessary.

Si: Si is an element effective for deoxidation of the molten steel in the production of the base metal and in deoxidation of the fusion zone in the step of welding. Since, however, the toughness tends to decrease when the Si content is higher than 1%, the content of Si, when it is used as the deoxidizer, is desirably not more than 1% for the base metal as well as for the weld metal. A more desirable upper limit is 0.5%.

For producing the deoxidizing effect of Si, it is desirable that the Si content be not less than 0.01%. A more desirable lower limit is 0.05%.

Accordingly, a desirable content of Si, when it is contained, is 0.01–1%, more desirably 0.05–0.5%.

Mn: Mn is an element effective for improving the deoxidation of the molten steel in the production of the base metal, or the deoxidation of the fusion zone in the step of welding, and the hot workability of the steel. For producing these effects, it is desirable that its content is not less than 0.05% for both the base metal and weld metal.

The upper limit of the Mn content is preferably set at 2% for both the base metal and weld metal. When the Mn content of the base metal is over 2%, segregation of Mn tends to occur within the slab for the production of the base metal, hence a decrease in toughness may occur due to the segregation of Mn and also the SCC resistance tends to decrease. A desirable upper limit of the Mn content of the base metal is 1%. When the Mn content of the weld metal exceeds 2%, the toughness and SCC resistance are apt to decrease.

Accordingly, when Mn is added, the Mn content is 0.05–2%, desirably 0.05–1%, for both the base metal and weld metal.

Ni: Ni is an element effective for securing the toughness of the welding heat affected zone in high level heat input welding. Therefore, Ni is contained when it is necessary to attain that effect. When its content is less than 3%, the amount of ferrite in the welding heat affected zone may become excessive, leading to failure to obtain sufficient strength and toughness in the welding heat affected zone. When, on the other hand, the Ni content of the base metal is higher than 9%, the Ms point lowers and the strength tends to decrease. A more desirable upper limit is 7%.

In the weld metal, Ni is effective for increasing the austenite phase proportion. Therefore, when it is necessary to obtain such effect, Ni is contained. For producing that effect, the Ni content is desirably not less than 2%, more desirably not less than 5%. When the Ni content of the weld metal is over 10%, the effect of Ni saturates and an increased cost is caused, hence the upper limit of the Ni content of the weld metal is preferably set to 10%.

Accordingly, when it is desirable for the base metal to contain Ni, its content is desirably 3–9%, more desirably 3–7% or 4–7%. When the weld metal contains Ni, the content thereof is desirably 2–10%, more desirably 5–10%. Since Co has almost the same effect as that of Ni, Co may be substituted for part of Ni.

Mo, W and Cu: These elements are effective for improving the sour gas resistance of the base metal and of the weld metal. Therefore, when the welded pipe is to be used for conveying a hydrogen sulfide-containing fluid, at least one of those elements is preferably contained. Mo and Cu are particularly effective for improving the sour gas resistance.

For obtaining the effect of these elements, the content of each of the elements in the base metal and in the weld metal is preferably not less than 0.5%. As for the base metal, however, when the Mo content exceeds 5%, the toughness in the welding heat affected zone decreases and, when the W content exceeds 6% and the Cu content exceeds 5%, the hot workability lowers. As regards the weld metal, when the Mo content exceeds 5% and when the W content and Cu content exceed 6% and 3%, respectively, the weld hot cracking resistance decreases.

Accordingly, when these elements are added to the base metal, the contents of Mo and Cu are each preferably 0.5–5% and the W content is preferably 0.5–6%. A desirable range of the Mo content is 1.5–4% and a desirable range of the Cu content is 1–3%.

As for the weld metal, the Mo content is preferably 0.5–5% and each of the W content and Cu content is preferably 0.5–3%. A desirable range of the Mo content is 1.5–4% and a desirable range of the W content and of the Cu content is 1–3%.

Sol. Al: Al is an element effective for deoxidation of the molten steel in base metal production or of the fusion zone in the step of welding. For obtaining the deoxidation effect of Al, it is recommendable that the sol. Al content is not less than 0.001% for the base metal as well as for the weld metal. When, on the other hand, the sol. Al content is over 0.1%, alumina clusters readily remain in the base metal or weld metal, hence toughness decreases.

Accordingly, when Al is added, the sol. Al content is preferably 0.001–0.1% for both the base metal and weld metal. A desirable content range is 0.001–0.4%, more preferably 0.001–b 0.01%.

V and Zr: Each of these elements is effective for fixing C and N in the steel as the carbide or nitride and thereby reducing the variations in strength, such as yield strength, of the base material and of the weld metal. When it is necessary to obtain this effect, it is recommended that at least one of the elements is contained. That effect becomes significant at a content of not less than 0.001% for each element. However, when the content of these elements exceeds 0.5% for the base metal or 0.3% for the weld metal, the base metal and weld metal both tend to decrease toughness and corrosion resistance.

Accordingly, when these elements are added, a desirable content of each element is 0.001–0.5%, more desirably 0.001–0.3%, for the base metal and 0.001–0.3%, more desirably 0.001–0.2%, for the weld metal.

Ca and Mg: These elements are effective for improving the hot workability of the base metal. Furthermore, they are also effective for preventing nozzle choking at a time of casting a slab for the base metal by continuous casting. Therefore, when it is necessary to obtain these effects, at least one of the elements is preferably added. The effects of these elements become significant at a content of not less than 0.0005% each. However, when the content of each exceeds 0.05%, coarse oxide particles thereof tend to remain in the steel, so that the toughness of the base metal tends to decrease and the particles may serve as initiation sites of pitting to reduce the corrosion resistance.

Accordingly, when these elements are to be contained in the base metal, their content should preferably be 0.0005–0.05% for each of Ca and Mg. A desirable range is 0.0005–0.03%, more desirably 0.0005–0.01%.

Ca and Mg can fix S in the weld metal and improve the weld hot cracking resistance. For obtaining the effect of these elements, they are preferably contained at a content of not less than 0.0003%. When, however, the content of these elements is over 0.03%, coarse oxide particles thereof readily remain in the weld metal and, in such cases, the toughness decreases and the coarse oxide particles serve as initiation sites of pitting to possibly decrease the corrosion resistance. Therefore, when these elements are added, a desirable content of each Ca and Mg is 0.0003–0.03%.

Ti: In cases where the metallurgical microstructure of the base metal is constituted of a martensite phase and a ferrite phase, the presence of Ti reduces the toughness of the base metal. In particular when the Ti content exceeds 0.1%, the decrease in toughness becomes significant. Therefore, the Ti content of the base metal is preferably not more than 0.1%. A desirable Ti content level is not more than 0. 05% and a more desirable one is not more than 0.015%.

On the other hand, Ti is generally added to the weld material to stabilize the welding arc. Therefore, Ti remains in the weld metal. The influence of Ti on the toughness of the weld metal is relatively slight but, at over 0.1%, the toughness tends to decrease. Therefore, the Ti content in the weld metal is desirably not more than 0.1%, more desirably not more than 0.05%, still more desirably not more than 0.03%.

P, S, N and O among impurities: Each of them is an element existing as an impurity and the content thereof in the base metal and weld metal should be as low as possible.

When the P content exceeds 0.025%, the corrosion resistance and toughness of the base metal and weld metal tend to decrease. Therefore, the P content is preferably not more than 0.025%. A level not more than 0.015% is more desirable and a level not more than 0.01% is still more desirable.

When the S content exceeds 0.01%, the hot workability, corrosion resistance and toughness of the base metal and the hot cracking resistance, corrosion resistance and toughness of the weld metal tend to decrease. Therefore, the S content in the base metal and in the weld metal is preferably not more than 0.01%, more desirably not more than 0.005%, still more desirably not more than 0.002%.

When the N content exceeds 0.02% in the base metal or over 0.05% in the weld metal, the toughness and corrosion resistance of the base metal as hot rolled or as welded show a tendency toward decrease and the toughness and corrosion resistance of the weld metal tend to decrease. In particular, the toughness of the welding heat affected zone of the base metal and the sour gas resistance of the base metal and of the weld metal tend to decrease. Therefore, the N content of the base metal is preferably not more than 0.02% and that of the weld metal not more than 0.05%. For both metals, the N content of not more than 0.01% is more desirable.

When the O (oxygen) content exceeds 0.01%, the toughness and corrosion resistance of the base metal and of the weld metal tend to decrease. Therefore, the O content is desirably not more than 0.01%, more desirably not more than 0.005%.

Preferred Modes of the Chemical Composition:

As mentioned hereinabove, the welded pipe of the invention shows excellent SCC resistance when used for the conveyance of crude oils or the like without treatment for dehydration. Further, as described under "Disclosure of Invention", the welded pipe of the invention can have further beneficial characteristics when the base metal or weld metal satisfies the following conditions with respect to the chemical composition thereof.

As already mentioned hereinabove, it is desirable that the metallurgical microstructures of the base metal is constituted of 55–90% martensite phase and 10–45% ferrite phase. For securing such metallurgical microstructures and at the same time obtaining a base metal excellent in strength and toughness and further showing such corrosion resistance features as sour gas resistance even when the heat treatment after hot rolling in the process of base metal plate production and/or the heat treatment after welding is omitted, it is desirable that the following conditions is satisfied.

The Cr, Ni and Ti contents of the base metal should be as follows: Cr: 11–20%, Ti: not more than 0.05%, Ni: 3–7%. And, when the base metal contains Mo, the contents of the elements including these should satisfy the relations (3) and (4) shown below simultaneously. The relation (3) is a condition favorable to obtaining a ferrite phase proportion of not less than 10% by volume and a martensite phase proportion of not more than 90% by volume while the relation (4) is a condition favorable to obtaining a martensite phase proportion of not less than 55% by volume and a ferrite phase proportion of not more than 45% by volume.

The symbols of elements in the relations (3) and (4) denote the contents (% by mass) of the respective elements contained in the steel.

$$Cr+1.5Mo-Ni-0.4Cu-14 \geq 0 \tag{3}$$

$$Cr+1.5Mo-2Ni-0.8Cu-12.5 \leq 0 \tag{4}$$

Referring to the weld metal, it is desirable that it is constituted of martensitic microstructures containing 5–30% austenite phase, as already mentioned hereinabove. The reason why such metallurgical microstructures are desired is that the cracking (called weld hot cracking) is to be prevented from occurring in the process of solidification from the molten state in the step of welding and the strength and toughness of the weld metal is to be improved. For preventing this cracking, a chemical composition should be selected such that ferrite phase occurs in appropriate amounts in the solidification process and in the cooling process after solidification and the ferrite phase disappears while the temperature falls to about 200° C.

Those conditions under which ferrite phases can occur in solidification process should be taken into consideration and, further, the weld metal should be constituted of martensite microstructure containing 5–30% by volume of austenite phases at ordinary temperature. For that purpose, it is desirable to properly select the contents of the ferrite-forming elements Cr and Mo and austenite-forming element Ni while taking the contents thereof into consideration simultaneously. For the weled pipe of the present invention, the contents of Cr, Ni, Mo and Ti in the base metal should be within the following respective ranges: Cr: 15–20%, Ni: 4–7%, Mo: 1.5–4% and Ti: not more than 0.015%; the contents of Cr, Ni, Mo, W and Ti in the weld metal should be within the following respective ranges: Cr: 11–18%, Ni: 5–10%, Mo: 1.5–4%, W: 0–4% and Ti: not more than 0.03%; and the following relations (5) and (6) should be satisfied:

$$-1 \leq Cr+Mo-1.7Ni \leq 13-220 \times O \text{ (oxygen)} \quad (5)$$

$$25 \leq Cr+Mo+1.8Ni \leq 30 \quad (6)$$

The relation (5) is directed to the ferrite phase formation in the process of solidification and the term "Cr+Mo−1.7×Ni" is an empirical formula indicating the tendency toward ferrite phase formation. As the value of this formula decreases, the ferrite phase yield decreases. However, when the value of this formula is less than −1, no ferrite phase exists at high temperatures immediately after solidification, hence weld hot cracking tends to occur. On the other hand, when the value of this formula is excessively high, the ferrite phase yield becomes excessive, hence the toughness decreases.

The toughness of this weld metal is strongly influenced by the content of O (oxygen). When the relation "Cr+Mo−1.7×Ni≤13−220×O", in which the O content is involved, is satisfied, the weld metal obtained can have sufficient toughness.

Referring to the relation (6), the term "Cr+Mo+1.8×Ni" is an empirical formula indicating the tendency toward austenite phase formation. When the value of this formula is less than 25, the austenite phase yield is slight and no sufficient toughness can be obtained. Conversely, when the value of this formula exceeds 30, the austenite phase yield becomes excessive, hence sufficient tensile strength and yield strength cannot be secured.

The term "sufficient tensile strength" as used referring to the weld metal means that, in a welded joint tensile test, failure occurs in the base metal portion but not in the weld metal portion. For the welded pipe of the invention, the weld metal should have a tensile strength of not less than 650 MPa so that the strength can be not below the X-80 grade (not less than 551 MPa in yield strength).

When the base metal satisfies the above relations (3) and (4) and the weld metal satisfies the relations (5) and (6), the welded pipe of the invention can become one further improved in characteristics.

In addition to the above features of the welded pipe, when the chemical composition of the base metal comprises: C: not more than 0.05%, Si: not more than 0.5%, Mn: not more than 1%, Cr: 9–17%, Ni: 0–9%, W: 0–1%, Cu: 0–3%, V: 0–0.3%, Ca: 0–0.01%, Ti: not more than 0.1% and the balance: Fe and impurities, and the chemical composition of the weld metal comprises: C: not more than 0.05%, Si: not more than 0.5%, Mn: not more than 1%, Cr: 9–20%, Ni: 0–9%, W: 0–3%, Cu: 0–3%, V: 0–0.2%, Ca: 0–0.01%, B: 0–0.01%, Ti: not more than 0.1% and the balance: Fe and impurities, the welded pipe shows the highest level of SCC resistance.

Use as a Pipe for a Pipeline:

The welded pipe of the invention is most effectively used as a pipe for a pipeline for conveying a crude oil or natural gas while omitting the treatment for dehydration. In particular, when the side edge of one pipe is joined to the side edge of another by welding during a construction of a pipeline, the weld metal portion and the heat affected zone of the base metal need not be subjected to postweld heat treatment. Therefore, the-pipeline can be used as welded condition. The side edge-to-side edge welding of pipes can be realized by applying such a welding method as the SAW method, TIG method, MIG method or MAG method.

Method of Producing the Welded Pipe:

The welded pipe of the present invention can be produced by a conventional method of producing ordinary welded pipes. A general method of production is as follows.

First, a hot strip or thick plate is cut to a width substantially equal to the outer circumference of the product pipe. Then, it is formed into a cylindrical form by the UOE method comprising forming by means of a C press, a U press and an O press. The joining portions are then welded together by the SAW method to produce a welded pipe. In the forming stage, the UO method, spiral method, roll bending method or like method may also be employed.

The welding conditions as well as the flux and welding wire can be selected taking into consideration the chemical composition of the weld metal and other factors. In cases where a fine adjustment in hardness becomes necessary, tempering or like treatment may be carried out.

The chemical composition of the base metal to be used can adequately be selected considering the above conditions according to the intended use of the welded pipe.

As for the method of producing the hot strip or thick plate, namely the base metal, any of the methods in conventional use may be employed. The hot strip or thick plate may be produced by the method comprising hot rolling a continuously cast slab or the method comprising blooming a steel ingot, followed by hot rolling.

In producing the base metal with a ferrite phase proportion of 10–45% by volume (martensite phase proportion of 55–90% by volume), the heating temperature for the material prior to hot rolling is desirably 1100° C.–1250° C. At a heating temperature exceeding 1250° C., ferrite phases may precipitate abundantly in some instances, with the result that the metallurgical microstructures of the product cannot be constituted mainly of a martensite phase. At below 1100° C., the material steel shows high deformation resistance, hence is difficult to hot roll.

EXAMPLES

Figure 2A:
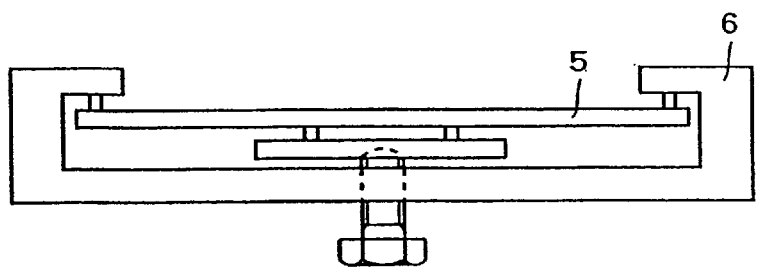
FIG. 2A and FIG. 2B are drawings illustrating the method of providing a bending stress for the SCC resistance and sour gas resistance tests as used in the examples.
Figure 2B:
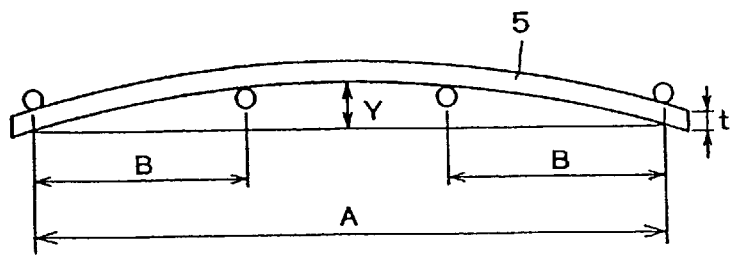
Figure 3:
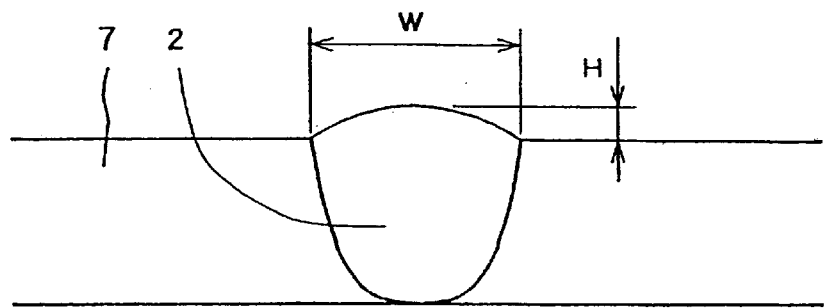
FIG. 3 is a schematic representation of the sectional structure of the weld made from the single pass weld material used in Examples 1 and 2.

The test methods used in Examples 1 to 3 in common are as follows. FIG. 3 is a schematic drawing showing the sectional structure of the weld portion formed by the single pass weld material 7 used in Examples 1 and 2 to be mentioned later herein. SCC resistance test: The size of test specimens was: thickness 5 mm×width 25.4 mm×length 165 mm. For each set of test conditions, one test specimen was prepared in Example 1 and two specimens were prepared in Example 2 and Example 3. A bending stress was applied by setting the test specimen 5 on a jig 6 for causing bending, as shown in FIG. 2A and FIG. 2B, so that the bending amount might arrive at Y (mm). "Y" is the bending amount arrived at when a stress equal in value to the yield strength (YS) of the base metal is applied as σ (bending stress) appearing in the equation shown in FIG. 2B at room temperature. The test specimens with this bending amount given were subjected to autoclave treatment. The treatment conditions were as follows: atmosphere—$CO_2$ gas at 30 atmospheres, test solution—10% (by mass) aqueous NaCl solution at 100° C., immersion time in solution—720 hours. The test specimens after treatment were observed by the eye for occurrence of cracking. In cases where the occurrence or nonoccurrence of cracking could not be confirmed definitely by visual observation alone, the section thereof was polished and then observed for occurrence or nonoccurence of cracking under an optical microscope.

The evaluation was made as follows. When the number of test specimens was one, the case where no crack was found was judged good "○" and the case where cracking was found was judged defective "X". When the number of test specimens was 2, the case where either specimen showed no cracking was judged good "○", the case where one specimen showed cracking was judged poor "Δ" and the case where both showed cracking was judged defective "X". $CO_2$ resistance test: The size of test specimens was: thickness 2 mm×width 20 mm×length 50 mm. The test specimens were subjected to autoclave treatment under the same conditions as in the SCC resistance test and examined for corrosion rate in that treatment.

The $CO_2$ resistance evaluation was made as follows. The case where the dimensional loss was not more than 1 mm was evaluated good "○" and other cases were evaluated defective "X". Sour gas resistance test: The size and number of test specimens were the same as in the SCC resistance test. The conditions of bending stress application were the same as in the SCC resistance test. The test specimens given the bending amount Y (mm) were subjected to autoclave treatment. The autoclave treatment conditions were as follows: atmosphere—$CO_2$ gas at 30 atmospheres with $H_2S$ gas at a partial pressure of 0.03 atmosphere, test solution— 10% (by mass) aqueous NaCl solution with pH 4.5 at a temperature of 25° C., immersion time—720 hours. The test specimens after treatment were observed by the eye for occurrence of cracking. In cases where the occurrence or nonoccurrence of cracking could not be confirmed definitely by visual observation alone, the section thereof was polished and then observed for occurrence or nonoccurence of cracking under an optical microscope.

The evaluation criteria were the same as in the SCC resistance test mentioned above.

Example 1

In Example 1, the relation between the weld bead shape and the SCC resistance was examined. Further, the combinations of five base metals and two weld materials differing in chemical composition, metallurgical microstructures and tensile characteristics were also examined.

In Table 1, there are shown the chemical compositions and metallurgical microstructures of 5 thick plates (symbols A–E), namely base metals, the chemical compositions of the weld materials (symbols F and G) used and the chemical compositions and metallurgical microstructures of the weld metals obtained from the combinations of these base metals and weld materials. All the base metals were martensitic stainless steels containing ferrite phase. Each thick plate had been adjusted so that its strength was of the X-80 grade (not less than 80 ksi (551 MPa) in yield strength) defined in the API standard. The size of each thick plates for welding test was as follows: 12.7–25.4 mm thick, 300 mm wide and 1 m long.

For the thick plates given the symbols B, D or E, steel plate specimens (2 specimens for the one given the symbol B) for actual pipe making testing, 1920 mm wide and 6 m long, were prepared and four large-diameter, thick-wall welded pipes, 610 mm in outside diameter and 6 m in length, were produced by the SAW method. The chemical composition of the weld material used in pipe making was that shown in Table 1 under the symbol G. The tests made for the welded pipes correspond to the test numbers 33–36 in Table 4.

Figure 4:
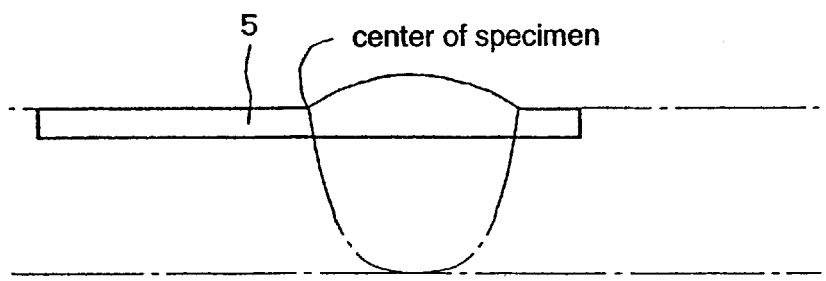
FIG. 4 is a drawing showing the site of test specimen sampling for the tests made in the examples, namely the site of collection of 4-point bending test specimens from the single pass weld material for SCC resistance and sour gas resistance testing.
Figure 5:
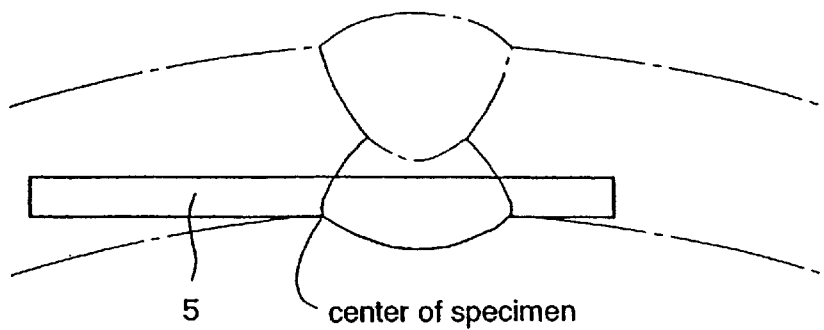
FIG. 5 is a drawing showing the site of test specimen sampling for the tests made in the examples, namely the site of collection of 4-point bending test specimens from the welded pipe for SCC resistance and sour gas resistance testing.

As for the 300-mm-wide thick plates for welding testing, one edge side thereof in the width direction was subjected to bevel machining according to the plate thickness and the beveled portions were joined and welded together by the single-pass SAW method. FIG. 3 shows the sectional structure of the weld bead portion of the test specimen after this welding (hereinafter referred to also as "weld joint"). The symbol 7 denotes the thick plate (base metal) and the symbol 2 denotes the weld metal. Two test specimens 5, 5 mm thick, 25.4 mm wide and 165 mm long, for four-point bending testing, with a weld bead, were each taken from the site of that weld joint as indicated in FIG. 4 and subjected to corrosion testing. As for the 6 m-long welded pipes, test specimens 5 for corrosion testing were each taken from the site shown in FIG. 5 judged to be the highest in the weld bead portion h.

As for the weld metal, two chemical compositions were employed and the chemical compositions of the weld materials of the weld joint portions mentioned above are also shown in Table 1. For 32 single pass-welded materials and 4 welded pipe test specimens, the test specimen sizes and test specimen weld bead shapes as formed are shown in Tables 2 to 4 for the respective test numbers.

TABLE 1

| | | Chemical composition (% by mass, the balance being Fe and impurities) | | | | | | | | | Metallurgical microstructures (vol. %) | |
|---|---|---|---|---|---|---|---|---|---|---|---|---|---|
| Material | Symbol*[1] | C | Si | Mn | Cr | Ni | Mo | Ti | W | Cu | N | Ferrite phase | Austenite phase |
| Base metal | A | 0.01 | 0.22 | 0.41 | 11.97 | 6.50 | 2.48 | 0.07 | — | — | 0.004 | 0 | 0 |
| | B | 0.01 | 0.21 | 0.40 | 12.57 | 5.27 | 0.80 | 0.07 | — | — | 0.004 | 11 | 0 |
| | C | 0.01 | 0.21 | 1.10 | 10.40 | 1.70 | 0.20 | — | — | — | 0.004 | 18 | 0 |
| | D | 0.01 | 0.25 | 0.40 | 12.00 | 4.00 | 3.00 | 0.08 | — | — | 0.004 | 32 | 0 |

TABLE 1-continued

| | | Chemical composition (% by mass, the balance being Fe and impurities) | | | | | | | | | Metallurgical microstructures (vol. %) | |
|---|---|---|---|---|---|---|---|---|---|---|---|---|---|
| Material | Symbol*[1] | C | Si | Mn | Cr | Ni | Mo | Ti | W | Cu | N | Ferrite phase | Austenite phase |
| | E | 0.01 | 0.25 | 0.40 | 10.00 | 1.00 | 0.50 | 0.08 | — | — | 0.004 | 20 | 0 |
| Weld material | F | 0.03 | 0.80 | 1.00 | 16.00 | 8.00 | 3.50 | 0.02 | 2.00 | 0.20 | 0.030 | — | — |
| | G | 0.04 | 0.15 | 1.10 | 14.00 | 7.00 | 0.80 | 0.07 | — | — | 0.004 | — | — |
| Weld metal | A-F | 0.02 | 0.48 | 0.68 | 13.33 | 7.18 | 2.71 | 0.05 | 0.90 | 0.10 | 0.016 | 0 | 30 |
| | B-F | 0.02 | 0.48 | 0.67 | 13.66 | 6.50 | 1.79 | 0.05 | 0.91 | 0.09 | 0.016 | 0 | 19 |
| | B-G | 0.02 | 0.18 | 1.10 | 12.02 | 7.09 | 0.47 | 0.03 | — | — | 0.004 | 0 | 6 |
| | C-F | 0.02 | 0.48 | 1.06 | 12.47 | 7.54 | 1.46 | 0.01 | 0.90 | 0.08 | 0.016 | 0 | 14 |
| | D-F | 0.02 | 0.50 | 0.67 | 13.35 | 5.80 | 3.00 | 0.05 | 0.88 | 0.12 | 0.016 | 0 | 18 |
| | E-F | 0.02 | 0.50 | 0.67 | 12.25 | 7.15 | 1.63 | 0.05 | 0.90 | 0.07 | 0.016 | 0 | 5 |
| | E-G | 0.02 | 0.21 | 0.72 | 11.80 | 5.70 | 0.64 | 0.08 | — | — | 0.004 | 0 | 3 |
| | B-G | 0.03 | 0.18 | 0.79 | 13.36 | 6.22 | 0.80 | 0.07 | — | — | 0.004 | 0 | 3 |
| | D-G | 0.03 | 0.20 | 0.79 | 13.10 | 5.65 | 1.79 | 0.07 | — | — | 0.004 | 0 | 10 |
| | E-G | 0.03 | 0.20 | 0.79 | 12.20 | 7.80 | 0.67 | 0.07 | — | — | 0.004 | 0 | 8 |

*[1]The symbol "A-F" of weld metal, for instance, means the combination of base metal A and weld material F.

TABLE 2

| Specimen No. | Base metal | Weld metal | Size | | Base metal strength (MPa) | | | Weld metal strength (MPa) | | |
|---|---|---|---|---|---|---|---|---|---|---|
| | | | Thickness (mm) | Outside diameter (mm) | Room temperature | | 100° C. | Room temperature | | 100° C. |
| | | | | | TS | YS | YS | TS | YS | YS |
| 1 | A | F | 19.0 | — | 855 | 585 | 556 | 827 | 600 | 490 |
| 2 | | | | | | | | | | |
| 3 | | | | | | | | | | |
| 4 | | | | | | | | | | |
| 5 | | | | | | | | | | |
| 6 | | | | | | | | | | |
| 7 | | | | | | | | | | |
| 8 | | | | | | | | | | |
| 9 | | | | | | | | | | |
| 10 | | | | | | | | | | |
| 11 | | | | | | | | | | |

| Specimen No. | Weld bead shape | | | Length of h*[1] (= L) (mm) where h > 1.25 (mm) | 0.2 W | SCC resistance | CO$_2$ resistance | Sour gas resistance |
|---|---|---|---|---|---|---|---|---|
| | Range Of H (mm) | Range of W (mm) | Range of h (mm) | | | | | |
| 1 | 1.32–2.00 | 19.0–23.0 | 1.26–1.37 | Total length | 3.8 | X | ○ | ○ |
| 2 | 1.31–1.50 | | 1.26–1.31 | Total length | 3.8 | X | ○ | ○ |
| 3 | | | 1.26–1.31 | 19.0 | 3.8 | X | ○ | ○ |
| 4 | | | | 9.5 | 3.8 | X | ○ | ○ |
| 5 | | | | 5.0 | 3.8 | X | ○ | ○ |
| 6 | | | | 3.8 | 3.8 | ○ | ○ | ○ |
| 7 | | | | 1.9 | 3.8 | ○ | ○ | ○ |
| 8 | 0.29–1.01 | | 1.15–1.25 | Total length | 3.8 | ○ | ○ | ○ |
| 9 | 1.73–2.00 | 28.5–34.2 | 1.26–1.28 | Total length | 5.7 | X | ○ | ○ |
| 10 | 0.41–1.52 | | 1.15–1.25 | Total length | 5.7 | ○ | ○ | ○ |
| 11 | 0.26–1.02 | | 1.14–1.21 | Total length | 5.7 | ○ | ○ | ○ |

*[1]"Total length" means the test specimen width 25.4 mm.

TABLE 3

| Specimen No. | Base metal | Weld metal | Size | | Base metal strength (MPa) | | | Weld metal strength (MPa) | | |
|---|---|---|---|---|---|---|---|---|---|---|
| | | | Thickness (mm) | Outside diameter (mm) | Room temperature | | 100° C. | Room temperature | | 100° C. |
| | | | | | TS | YS | YS | TS | YS | YS |
| 12 | B | F | 12.7 | | 776 | 627 | 596 | 827 | 600 | 494 |
| 13 | | | | | | | | | | |
| 14 | | G | | | | | | | | |
| 15 | | | | | | | | | | |
| 16 | | | | | | | | | | |
| 17 | C | F | 25.4 | | 720 | 570 | 542 | 827 | 600 | 491 |
| 18 | | | | | | | | | | |
| 19 | | | | | | | | | | |
| 20 | | | | | | | | | | |
| 21 | | | | | | | | | | |
| 22 | | | | | | | | | | |
| 23 | | | | | | | | | | |

| Specimen No. | Weld bead shape | | | | 0.2 W | SCC resistance | $CO_2$ resistance | Sour gas resistance |
|---|---|---|---|---|---|---|---|---|
| | Range Of H (mm) | Range of W (mm) | Range of h | Length of h*1 (= L) (mm) where h > 1.25 (mm) | | | | |
| 12 | 0.56–0.84 | 25.4–30.5 | 1.26–1.29 | Total length | 5.1 | X | ○ | ○ |
| 13 | 0.33–0.40 | | 1.23–1.25 | 0 | 5.1 | ○ | ○ | ○ |
| 14 | 2.60–2.97 | | 1.26–1.29 | Total length | 5.1 | X | ○ | ○ |
| 15 | 1.88–2.50 | | 1.20–1.25 | 0 | 5.1 | ○ | ○ | ○ |
| 16 | 1.27–2.00 | | 1.15–1.21 | 0 | 5.1 | ○ | ○ | ○ |
| 17 | 2.69–3.03 | 38.1–41.9 | 1.26–1.28 | Total length | 7.6 | X | ○ | — |
| 18 | | | 1.26–1.28 | 20.0 | 7.6 | X | ○ | — |
| 19 | | | | 10.0 | 7.6 | X | ○ | ○ |
| 20 | | | | 7.5 | 7.6 | ○ | ○ | — |
| 21 | | | | 5.0 | 7.6 | ○ | ○ | — |
| 22 | 1.63–2.52 | | 1.19–1.25 | 0 | 7.6 | ○ | ○ | — |
| 23 | 1.26–2.00 | | 1.17–1.22 | 0 | 7.6 | ○ | ○ | — |

*1"Total length" means the test specimen width 25.4 mm.

TABLE 4

| Specimen No. | Base metal | Weld metal | Size | | Base metal strength (MPa) | | | Weld metal strength (MPa) | | |
|---|---|---|---|---|---|---|---|---|---|---|
| | | | Thickness (mm) | Outside diameter (mm) | Room temperature | | 100° C. | Room temperature | | 100° C. |
| | | | | | TS | YS | YS | TS | YS | YS |
| 24 | D | F | 19.0 | — | 773 | 580 | 534 | 827 | 600 | 492 |
| 25 | | | | | | | | | | |
| 26 | | | | | | | | | | |
| 27 | E | | | | 770 | 578 | 532 | | | |
| 28 | | | | | | | | | | |
| 29 | | | | | | | | | | |
| 30 | | G | | | | | | 940 | 670 | 570 |
| 31 | | | | | | | | | | |
| 32 | | | | | | | | | | |
| 33 | B | | 12.7 | 610 | 791 | 633 | 601 | | | |
| 34 | | | 19.0 | | 790 | 627 | 599 | | | |
| 35 | D | | 25.4 | | 788 | 591 | 544 | | | |
| 36 | E | | 19.0 | | 770 | 578 | 530 | | | |

TABLE 4-continued

| | | Weld bead shape | | | | | | |
|---|---|---|---|---|---|---|---|---|
| Specimen No. | Range Of H (mm) | Range of W (mm) | Range of h (mm) | Length of h*[1] (= L) (mm) where h > 1.25 (mm) | 0.2 W | SCC resistance | $CO_2$ resistance | Sour gas resistance |
| 24 | 2.25–2.51 | 28.0–33.6 | 1.26–1.28 | Total length | 5.6 | X | ○ | ○ |
| 25 | 1.77–2.00 | | 1.20–1.24 | 0 | 5.6 | ○ | ○ | ○ |
| 26 | 1.00–1.48 | | 1.15–1.20 | 0 | 5.6 | ○ | ○ | ○ |
| 27 | 2.31–2.51 | | 1.26–1.28 | Total length | 5.6 | X | ○ | — |
| 28 | 1.83–2.04 | | 1.21–1.24 | 0 | 5.6 | ○ | ○ | — |
| 29 | 1.12–1.53 | | 1.16–1.20 | 0 | 5.6 | ○ | ○ | — |
| 30 | 4.90–5.04 | | 1.26–1.27 | Total length | 5.6 | X | ○ | — |
| 31 | 4.15–4.45 | | 1.21–1.23 | 0 | 5.6 | ○ | ○ | — |
| 32 | 3.68–4.00 | | 1.17–1.20 | 0 | 5.6 | ○ | ○ | — |
| 33 | 1.24–1.49 | 25.0–27.5 | 1.15–1.18 | 0 | 5.0 | ○ | ○ | ○ |
| 34 | 0.98–1.45 | 28.0–30.1 | 1.12–1.16 | 0 | 5.6 | ○ | ○ | ○ |
| 35 | 0.96–2.00 | 38.0–40.1 | 1.00–1.05 | 0 | 7.6 | ○ | ○ | ○ |
| 36 | 1.54–2.50 | 28.0–28.5 | 1.03–1.09 | 0 | 5.6 | ○ | ○ | — |

*[1]"Total length" means the test specimen width 25.4 mm.

Among the single pass welded materials shown in Table 2 to Table 4, the materials of specimen numbers 3–7 were the same as those of the single pass welded material of specimen number 2 and the materials of specimen numbers 18–21 were the same as the single pass welded material of specimen number 17. However, the both sides other than the length L had been cut off by cutting treatment to the same height as the base metal surface.

And, each of the thus-obtained single pass weld materials and welded pipes was subjected to the following tests as welded, namely without any heat treatment after welding.

Each test specimen was subjected to tensile test, weld bead shape measurement, SCC resistance test, $CO_2$ resistance test and sour gas resistance test.

The tensile test conditions in Example 1 were as follows:

For both the single pass weld materials and welded pipes, the test specimen sampling site was in the direction perpendicular to the steel plate rolling direction for the base metal portions and in the direction tangential to the direction of seam welding for the base metal portions and the size of each test specimen was as follows: 8 mm in outside diameter and 60 mm in parallel portion length. The test temperature was 100° C. or room temperature and, at the temperature 100° C., the yield strength (YS) of the base metal and of the weld metal was measured and, at room temperature, the tensile strength (TS) and yield strength (YS) of each of the base and weld metals were examined.

The results of the above tests are also shown in Tables 2 to 4.

The results shown in Tables 2 to 4 indicate the following.

The single pass welded portions (specimen numbers 6–8, 10, 11, 13, 15, 16, 20–23, 25, 26, 28, 29, 31 and 32) and welded pipes (specimen numbers 33–36) satisfying the conditions defined by the present invention with respect to the weld bead shape all showed good SCC resistance and were excellent in $CO_2$ resistance as well.

As regards the sour gas resistance, the single pass welded portions and welded pipes other than those of specimen numbers 20–23, 28, 29, 31 and 32 where the Mo content in the base metal was low showed good results. From these results, it was confirmed that when sour gas resistance is required, it is desirable to employ another measure for improving the sour gas resistance in combination with measures for satisfying the conditions defined by the present invention with respect to the weld bead shape.

On the other hand, those single pass welded portions which failed to satisfy the conditions defined by the present invention concerning the weld bead shape (specimen numbers 1–5, 9, 12, 14, 17–19, 24, 27, 30) were all poor in SCC resistance.

The specimens numbered 20–23, 28, 29, 31, 32 and 36 whose weld bead shape satisfied the weld bead shape conditions defined by the present invention were excellent in SCC resistance and further in $CO_2$ resistance. Their sour gas resistance was poor, however.

Example 2

In Example 2, the welded pipes satisfying the weld bead shape conditions defined by the invention, namely welded pipes showing good SCC resistance, were examined to find out the desirable conditions concerning the chemical composition and metallurgical microstructure of the base metal. In particular, the conditions to be satisfied by the base metal, even as welded, to have good sour gas resistance and toughness were researched.

The chemical compositions of 26 kinds of steel (base metals) tested are shown in Table 5. The 24 steels designated Nos.a–u and x–z were each worked up into a plate, 25 mm thick, 120 mm wide and 400 mm long, by the process of melting each steel in a small melting furnace, casting it into an ingot, heating the resulting casting at 1200° C., hot forging the same into a slub and, further, hot rolling the resulting slab under the following conditions: number of passes=5, finishing temperature=980° C. The steel designated Nos.s–u were those in prior art. The steels designated No.v and w were thick plates, 19 mm in thickness, for pipe production as produced in an actual plant.

TABLE 5

| Steel No. | Chemical composition (% by mass, the balance being Fe and impurities) | | | | | | | | | | | | |
|---|---|---|---|---|---|---|---|---|---|---|---|---|---|
| | C | Si | Mn | P | S | Cr | Ni | Mo | Ti | sol.Al | N | O | Others |
| a | 0.006 | 0.34 | 0.60 | 0.010 | 0.0008 | 15.1 | 4.1 | 2.9 | 0.003 | 0.019 | 0.004 | 0.002 | V: 0.05, Ca: 0.0012 |
| b | 0.007 | 0.34 | 0.55 | 0.009 | 0.0008 | 16.3 | 5.1 | 3.1 | 0.003 | 0.016 | 0.005 | 0.002 | V: 0.06, Ca: 0.0013 |
| c | 0.006 | 0.34 | 0.91 | 0.008 | 0.0009 | 15.2 | 5.0 | 2.8 | 0.002 | 0.014 | 0.005 | 0.004 | V: 0.04 |
| d | 0.009 | 0.29 | 0.51 | 0.005 | 0.0008 | 14.3 | 3.8 | 3.3 | 0.005 | 0.016 | 0.005 | 0.004 | V: 0.09 |
| e | 0.008 | 0.35 | 1.27 | 0.010 | 0.0009 | 15.9 | 4.5 | 3.2 | 0.003 | 0.012 | 0.002 | 0.002 | V: 0.06 |
| f | 0.008 | 0.05 | 0.58 | 0.010 | 0.0009 | 17.0 | 5.4 | 3.6 | 0.004 | 0.013 | 0.002 | 0.003 | V: 0.02 |
| g | 0.009 | 0.24 | 0.48 | 0.009 | 0.0008 | 17.0 | 5.9 | 2.7 | 0.005 | 0.011 | 0.002 | 0.003 | — |
| h | 0.009 | 0.31 | 0.40 | 0.006 | 0.0007 | 16.0 | 5.9 | 2.9 | 0.003 | 0.015 | 0.004 | 0.004 | — |
| i | 0.004 | 0.65 | 0.59 | 0.010 | 0.0008 | 14.9 | 3.5 | 3.3 | 0.005 | 0.013 | 0.004 | 0.003 | V: 0.05, Cu: 1.5 |
| j | 0.008 | 0.34 | 1.08 | 0.004 | 0.0009 | 16.3 | 4.3 | 3.1 | 0.003 | 0.013 | 0.002 | 0.002 | V: 0.04 |
| k | 0.009 | 0.34 | 0.34 | 0.009 | 0.0008 | 15.1 | 4.0 | 3.1 | 0.004 | 0.020 | 0.005 | 0.005 | V: 0.05, Zr: 0.6 |
| l | 0.008 | 0.45 | 0.58 | 0.010 | 0.0007 | 16.1 | 4.3 | 3.0 | 0.005 | 0.010 | 0.005 | 0.002 | V: 0.05, Ca: 0.0015 |
| m | 0.009 | 0.56 | 1.09 | 0.009 | 0.0006 | 15.0 | 5.2 | 3.5 | 0.003 | 0.012 | 0.002 | 0.002 | Ca: 0.0014 |
| n | 0.006 | 0.35 | 0.33 | 0.008 | 0.0008 | 15.9 | 5.0 | 4.1 | 0.005 | 0.018 | 0.004 | 0.002 | V: 0.48 |
| o | 0.005 | 0.25 | 0.57 | 0.005 | 0.0009 | 13.5 | 3.5 | 3.9 | 0.005 | 0.017 | 0.002 | 0.002 | V: 0.06, Ca: 0.045 |
| p | 0.005 | 0.39 | 0.13 | 0.015 | 0.0012 | 13.1 | 5.8 | 2.1 | 0.002 | 0.010 | 0.009 | 0.005 | Ca: 0.0011 |
| q | 0.007 | 0.31 | 0.67 | 0.014 | 0.0012 | 17.1 | 3.8 | 3.5 | 0.005 | 0.011 | 0.002 | 0.003 | Ca: 0.0008 |
| r | 0.007 | 0.71 | 0.33 | 0.016 | 0.0011 | 15.3 | 4.5 | 3.5 | 0.080 | 0.019 | 0.005 | 0.004 | Mg: 0.0009 |
| s | 0.009 | 0.70 | 0.40 | 0.015 | 0.0015 | 14.6 | 5.4 | 0.9 | 0.003 | 0.013 | 0.009 | 0.003 | Cu: 0.5 |
| t | 0.010 | 0.43 | 0.49 | 0.016 | 0.0012 | 15.9 | 6.0 | — | 0.002 | 0.012 | 0.006 | 0.003 | Cu: 0.6 |
| u | 0.010 | 0.61 | 0.50 | 0.017 | 0.0015 | 15.1 | 6.0 | — | 0.008 | 0.012 | 0.008 | 0.005 | Cu: 0.5 |
| v | 0.008 | 0.16 | 0.42 | 0.009 | 0.0010 | 15.8 | 5.1 | 3.1 | 0.001 | 0.001 | 0.007 | 0.002 | V: 0.02, Cu: 0.3 |
| w | 0.008 | 0.16 | 0.42 | 0.009 | 0.0010 | 19.5 | 6.0 | 1.5 | 0.001 | 0.0024 | 0.005 | 0.003 | Ca: 0.0025 |
| x | 0.007 | 0.25 | 0.45 | 0.008 | 0.0010 | 11.2 | 2.0 | 3.3 | 0.001 | 0.0015 | 0.006 | 0.003 | |
| y | 0.006 | 0.24 | 0.48 | 0.012 | 0.0010 | 16.1 | 2.0 | — | 0.002 | 0.0022 | 0.007 | 0.002 | |
| z | 0.008 | 0.35 | 0.52 | 0.011 | 0.0010 | 18.8 | 8.9 | 2.8 | 0.002 | 0.016 | 0.007 | 0.002 | |

A welding wire, 4 mm in diameter, containing C: 0.01%, Cr: 12%, Ni: 9% and Mo: 3% by mass and a high basicity bond flux were prepared as the weld materials.

And, mimicking the actual welded pipe production process, the side edges, parallel to the direction of rolling, of each plate prepared were worked to give Y shape bevels with an angle of 60 degrees and a root face height of 13 mm and the worked portions were butt welded. Single pass welding was performed by the SAW method and the weld heat input was 7.5 kJ/mm.

Then, the test specimens mentioned below were taken from the base metal portion and butt welded portion after welding and examined for mechanical properties (yield strength and toughness) and sour gas resistance.

The tensile test specimens for yield strength measurement were taken from a site in the direction perpendicular to the direction of rolling of the base metal and had the shape of a round bar with a diameter of 4 mm and a gauge length of 20 mm.

The Charpy impact test specimens for toughness measurement were taken from a site in the direction perpendicular to the direction of rolling and had the shape of No. 4 specimen standardized in JIS Z 2202 (1980) (length: 75 mm, width: 10 mm, notch: 2 mm V). The Charpy impact test specimens were cut out from both the base metal and butt welded portion. The No. 4 specimens cut out from the butt welded portion were notched in the weld bond portion (boundary between the fusion zone and unfused zone). The toughness was evaluated in terms of vTrs.

The test specimens for sour gas resistance test were taken from a site in the direction perpendicular to the direction of rolling and were V-notched 4-point bent beam test specimens, 2 mm in thickness, 10 mm in width and 75 mm in length. As for the number of specimens, two were taken from the middle in the direction of thickness for the base metal and for the butt welded portion. The 4-point bent beam test specimens cut out from the butt welded portion were notched in the weld bond portion in the same manner as the above-mentioned Charpy impact test specimens.

The bending stress applied in sour gas resistance test was as mentioned above. The specimen treatment conditions were as follows: atmosphere—carbon dioxide gas at a partial pressure of 30 atmospheres and $H_2S$ gas at a partial pressure of 0.01 atmosphere, solution—an aqueous solution containing 5% by mass of NaCl at a temperature of 25° C., immersion time—200 hours. The sour gas resistance was evaluated by the method mentioned above.

The results of material characteristics evaluation are shown in Table 6, together with the calculated values for confirming the relations (3) and (4) defined by the present invention concerning the desirable chemical composition of the base metal.

TABLE 6

| Specimen No. | Steel No. | Base metal chemical composition characteristics | | Metallurgical microstructures (vol. %) | | Base metal material characteristics | | | Welding heat affected zone material characteristics | |
|---|---|---|---|---|---|---|---|---|---|---|
| | | Value of formula f(3)*2 | Value of formula f(4)*3 | Martensite phase | Ferrite phase | Yield strength (MPa) | Toughness vTrs(° C.) | Sour gas resistance | Toughness vTrs(° C.) | Sour gas resistance |
| 1 | a | 1.35 | −1.25 | 74 | 26 | 595 | −58 | ◯ | −42 | ◯ |
| 2 | b | 1.85 | −1.75 | 70 | 30 | 599 | −57 | ◯ | −40 | ◯ |
| 3 | c | 0.4 | −3.1 | 86 | 14 | 662 | −77 | ◯ | −59 | ◯ |
| 4 | d | 1.45 | −0.85 | 66 | 34 | 586 | −51 | ◯ | −41 | ◯ |
| 5 | e | 2.2 | −0.80 | 62 | 38 | 568 | −46 | ◯ | −33 | ◯ |
| 6 | f | 3.0 | −0.90 | 61 | 39 | 557 | −41 | ◯ | −22 | ◯ |
| 7 | g | 1.15 | −3.25 | 81 | 39 | 648 | −78 | ◯ | −59 | ◯ |
| 8 | h | 0.45 | −3.95 | 88 | 12 | 675 | −84 | ◯ | −64 | ◯ |
| 9 | i | 1.75 | −0.85 | 64 | 36 | 579 | −48 | ◯ | −34 | ◯ |
| 10 | j | 1.85 | −1.75 | 75 | 25 | 601 | −56 | ◯ | −45 | ◯ |
| 11 | k | 1.75 | −0.75 | 63 | 37 | 579 | −48 | ◯ | −36 | ◯ |
| 12 | l | 2.3 | −0.50 | 60 | 40 | 562 | −46 | ◯ | −27 | ◯ |
| 13 | m | 1.05 | −2.65 | 81 | 19 | 637 | −66 | ◯ | −48 | ◯ |
| 14 | n | 3.05 | −0.45 | 57 | 43 | 553 | −44 | ◯ | −30 | ◯ |
| 15 | o | 1.85 | −0.15 | 60 | 40 | 561 | −44 | ◯ | −26 | ◯ |
| 16 | p | −3.55 | −7.85 | 100 | 0 | 812 | −78 | Δ | −56 | Δ |
| 17 | q | 4.55 | 2.25 | 26 | 74 | 444 | −10 | ◯ | 15 | ◯ |
| 18 | r | 2.05 | −0.95 | 66 | 34 | 575 | 6 | ◯ | 25 | ◯ |
| 19 | s | −3.63 | −7.71 | 100 | 0 | 820 | −71 | X | −58 | X |
| 20 | t | −4.34 | −9.08 | 100 | 0 | 839 | −81 | X | −64 | X |
| 21 | u | −5.096 | −9.79 | 100 | 0 | 843 | −82 | X | −56 | X |
| 22 | v | 1.35 | −2.25 | 72 | 28 | 590 | −55 | ◯ | −42 | ◯ |
| 23 | w | 1.75 | −2.75 | 68 | 32 | 584 | −46 | ◯ | −31 | ◯ |
| 24 | x | 0.15 | −0.35 | 60 | 40 | 560 | −40 | ◯ | −25 | ◯ |
| 25 | y | 0.10 | −0.40 | 62 | 38 | 567 | −48 | ◯ | −33 | ◯ |
| 26 | z | 0.10 | −7.30 | 82 | 18 | 641 | −67 | ◯ | −58 | ◯ |

*1 ◯ indicates that the result was good and X - poor.
*2 f(3) = Cr + 1.5 × Mo − Ni − 0.4 × (Cu + Co) − 14
*3 f(4) = Cr + 1.5 × Mo − 2 × Ni − 0.8 × (Cu + Co) − 12.5

The results shown in Table 6 clearly indicate the following.

The chemical compositions of the specimens Nos. 1–15 and 22–26 satisfied the relations (3) and (4) and the ferrite phase proportions were 12–43% by volume (martensite phase 57–88% by volume). Therefore, the base metal in the vicinity of the weld bead toe and the welding heat affected zone both showed good sour gas resistance and toughness. The yield strength was also high and met the X-80 grade requirement prescribed in API, namely 551–675 MPa.

On the other hand, the specimen Nos. 16, 17 and 19–21, which failed to satisfy one of the relations (3) or (4), were poor in at least one of sour gas resistance and toughness. Among them, the specimen Nos. 19–21, namely the conventional steels, all had chemical compositions failing to satisfy the relation (3) and, therefore, the metallurgical microstructures showed a full martensite phase and no ferrite phase was present. As a result, the yield strength was abnormally high, namely 820–843 MPa, although the toughness was good.

It was therefore confirmed that when sour gas resistance and toughness are required in addition to SCC resistance, it is desirable for the base metal to satisfy the relations (3) and (4) and to have the ferrite phase proportion to be not more than 45% by volume.

Example 3

In Example 3, the welded pipes satisfying the weld bead shape requirements defined by the present invention, namely welded pipes having good SCC resistance, were examined to find out the desirable conditions to be satisfied by the chemical composition and metallurgical microstructures of the weld metal. In particular, the conditions to be satisfied by the weld metal, even as welded, to have good sour gas resistance and toughness were researched. In Example 3, the investigations were also made concerning the weld hot cracking susceptibility.

In Example 3, the welded portion of each welded pipe was investigated for confirming the desirable chemical compositions and metallurgical microstructures which the weld metal should have. For that purpose, the thick plates prepared and designated Nos. v and w in Example 2 were used as the base metals. These base metals were formed into open pipes and welded pipes, 608 mm in outside diameter (24 inches) and 19 mm in wall thickness, were produced by welding the joining portions together by the SAW method.

For forming weld metal portions differing in chemical composition, 12 kinds of wire, 4 mm in diameter, differing in chemical composition as shown in Table 7 were used as the weld material in pipe production. Further, two kinds of melting flux differing in basicity were combinedly used in welding. Thus, 19 kinds of welded pipe differing in weld metal chemical composition were prepared. The welding conditions were as follows: method—3—electrode SAW method, heat input—4.5 kJ/mm. The chemical compositions of the weld metals are shown in Table 8.

TABLE 7

| Sym-bol | Weld material chemical composition (in % by mass, the balance being Fe and impurities) | | | | | | | | |
|---|---|---|---|---|---|---|---|---|---|
| | C | Si | Mn | P | S | Ni | Cr | Mo | Ti |
| W1 | 0.007 | 0.33 | 0.52 | 0.013 | 0.002 | 2.4 | 12.2 | 3.11 | 0.011 |
| W2 | 0.011 | 0.31 | 0.51 | 0.011 | 0.002 | 4.5 | 12.0 | 3.02 | 0.012 |
| W3 | 0.008 | 0.32 | 0.51 | 0.008 | 0.003 | 6.5 | 12.0 | 2.95 | 0.011 |
| W4 | 0.009 | 0.33 | 0.51 | 0.006 | 0.003 | 8.9 | 12.3 | 3.06 | 0.011 |
| W5 | 0.015 | 0.33 | 0.51 | 0.015 | 0.003 | 12.0 | 12.5 | 3.01 | 0.011 |
| W6 | 0.008 | 0.31 | 0.82 | 0.012 | 0.003 | 9.8 | 5.0 | 0.39 | 0.005 |
| W7 | 0.008 | 0.33 | 0.82 | 0.013 | 0.003 | 9.7 | 9.0 | 2.59 | 0.012 |
| W8 | 0.008 | 0.33 | 0.51 | 0.012 | 0.004 | 9.8 | 12.5 | 2.61 | 0.019 |
| W9 | 0.008 | 0.33 | 0.51 | 0.011 | 0.003 | 9.1 | 14.5 | 3.05 | <0.001 |
| W10 | 0.004 | 0.21 | 0.40 | 0.008 | 0.001 | 9.0 | — | 0.11 | 0.005 |
| W11 | 0.009 | 0.32 | 0.49 | 0.008 | 0.001 | 9.5 | 7.5 | 2.99 | 0.010 |
| W12 | 0.009 | 0.32 | 0.49 | 0.008 | 0.001 | 5.5 | 7.5 | 2.99 | 0.010 | resistance was indicated by "○" (good) and when cracking was observed, by "X" (poor).

The test specimens for tensile test were No. 5 specimens standardized in JIS Z 2201 with a parallel portion length of 110 mm and a gauge length of 100 mm. The specimens were taken in the direction perpendicular to the fusion line so that the parallel portion contained the weld metal, welding heat affected zone and base metal. The test temperature was room temperature. The test results were indicated by "○" (good) when the failure occurred in the base metal portion and by "X" (poor) when the failure occurred in the weld metal portion.

The Charpy impact test specimens for toughness measurement were taken from each weld joint in the direction perpendicular to the weld bead. The specimens had the same shape and size as in Example 2 and the notch of each specimen was formed so that it was in the middle of the weld metal. The test temperature was −30° C. and the toughness was evaluated in terms of absorbed energy $vE_{-30°C}$. The toughness was evaluated as good "○" when the absorbed energy was not less than 50 J and as poor "X" when it was less than 50 J.

The test specimens for sour gas resistance test had the shape of a plate, 5 mm in thickness, 20 mm in width and 165 mm in parallel portion length. The specimens were taken in the direction perpendicular to the fusion line so that the fusion line (middle portion of the weld bead) was located in the middle of the specimen length. As for the reinforcement of weld, one side retained it and the reverse side was ground smoothly. The method of bending stress application and the autoclave treatment conditions were as mentioned above.

The workability was evaluated by a test comprising bending the butt welded plate at a radius of curvature which

TABLE 8

| Specimen No. | Base metal | Wire | Weld metal chemical composition (in % by mass, the balance being Fe and impurities) | | | | | | | | | | | |
|---|---|---|---|---|---|---|---|---|---|---|---|---|---|---|
| | | | C | Si | Mn | P | S | Ni | Cr | Mo | Ti | O | sol.Al | N | Others |
| 1 | v | W1 | 0.008 | 0.23 | 0.46 | 0.011 | 0.002 | 4.02 | 14.34 | 3.08 | 0.005 | 0.026 | 0.012 | 0.008 | V: 0.015, Cu: 0.18 |
| 2 | v | W2 | 0.009 | 0.22 | 0.46 | 0.010 | 0.002 | 4.86 | 14.35 | 3.04 | 0.005 | 0.025 | 0.011 | 0.008 | V: 0.015, Cu: 0.18 |
| 3 | v | W3 | 0.008 | 0.22 | 0.46 | 0.009 | 0.002 | 5.66 | 14.35 | 3.02 | 0.005 | 0.026 | 0.010 | 0.010 | V: 0.015, Cu: 0.18 |
| 4 | v | W4 | 0.008 | 0.23 | 0.46 | 0.007 | 0.002 | 6.62 | 14.34 | 2.99 | 0.005 | 0.027 | 0.012 | 0.009 | V: 0.015, Cu: 0.18 |
| 5 | v | W5 | 0.011 | 0.23 | 0.46 | 0.012 | 0.002 | 7.86 | 14.51 | 3.04 | 0.005 | 0.025 | 0.013 | 0.008 | V: 0.015, Cu: 0.18 |
| 6 | v | W6 | 0.008 | 0.22 | 0.58 | 0.010 | 0.002 | 7.00 | 11.53 | 1.99 | 0.003 | 0.024 | 0.011 | 0.012 | V: 0.015, Cu: 0.18 |
| 7 | v | W7 | 0.008 | 0.23 | 0.58 | 0.011 | 0.002 | 6.93 | 13.14 | 2.87 | 0.005 | 0.026 | 0.012 | 0.008 | V: 0.015, Cu: 0.18 |
| 8 | v | W8 | 0.008 | 0.23 | 0.46 | 0.010 | 0.003 | 6.96 | 14.53 | 2.88 | 0.016 | 0.024 | 0.015 | 0.009 | V: 0.015, Cu: 0.18 |
| 9 | v | W9 | 0.008 | 0.23 | 0.46 | 0.010 | 0.002 | 6.71 | 15.33 | 3.06 | 0.001 | 0.028 | 0.012 | 0.010 | V: 0.015, Cu: 0.18 |
| 10 | w | W10 | 0.006 | 0.22 | 0.45 | 0.008 | 0.001 | 7.78 | 7.82 | 0.68 | 0.002 | 0.025 | 0.013 | 0.011 | V: 0.015, Cu: 0.18 |
| 11 | w | W10 | 0.007 | 0.22 | 0.45 | 0.008 | 0.001 | 7.50 | 9.78 | 0.78 | 0.002 | 0.025 | 0.012 | 0.008 | V: 0.015, Cu: 0.18 |
| 12 | v | W4 | 0.008 | 0.25 | 0.46 | 0.007 | 0.002 | 7.02 | 14.02 | 3.06 | 0.005 | 0.044 | 0.011 | 0.009 | V: 0.011, Cu: 0.14 |
| 13 | v | W6 | 0.008 | 0.24 | 0.62 | 0.010 | 0.002 | 7.53 | 10.44 | 1.73 | 0.003 | 0.045 | 0.012 | 0.009 | V: 0.011, Cu: 0.14 |
| 14 | v | W7 | 0.008 | 0.25 | 0.62 | 0.011 | 0.002 | 7.45 | 12.38 | 2.83 | 0.006 | 0.046 | 0.010 | 0.010 | V: 0.011, Cu: 0.14 |
| 15 | v | W8 | 0.008 | 0.25 | 0.47 | 0.011 | 0.003 | 7.51 | 14.11 | 2.84 | 0.010 | 0.046 | 0.012 | 0.011 | V: 0.011, Cu: 0.14 |
| 16 | v | W7 | 0.008 | 0.25 | 0.62 | 0.010 | 0.002 | 8.58 | 12.28 | 2.73 | 0.006 | 0.055 | 0.010 | 0.009 | V: 0.011, CU: 0.14 |
| 17 | v | W11 | 0.008 | 0.23 | 0.45 | 0.009 | 0.001 | 6.86 | 12.48 | 3.05 | 0.005 | 0.035 | 0.014 | 0.008 | V: 0.015, Cu: 0.18 |
| 18 | v | W11 | 0.008 | 0.23 | 0.45 | 0.009 | 0.001 | 7.50 | 11.65 | 3.03 | 0.005 | 0.050 | 0.012 | 0.009 | V: 0.010, Cu: 0.15 |
| 19 | v | W12 | 0.008 | 0.23 | 0.45 | 0.009 | 0.001 | 5.22 | 12.48 | 3.05 | 0.005 | 0.025 | 0.012 | 0.010 | V: 0.010, Cu: 0.15 |

The weld metals were evaluated for weld hot cracking resistance based on the occurrence or nonoccurrence of cracking in the weld metal portions of the above welded pipes. When no crack was observed, the weld hot cracking was twice the plate thickness. The test results were indicated by "○" (good workability) when no cracking, crush or like trouble occurred and by "X" (poor workability) for other cases.

The test results are summarized in Table 9.

TABLE 9

| Specimen No. | Base metal | Welding conditions Wire | Flux basicity | Value of formula f(5)*3 | Value of formula f(5')*4 | Value of formula f(6)*5 | Metallurgical microstructures (vol. %) Martensite | Austenite | Tensile test results | Weld hot cracking resistance | Workability | Sour gas resistance | Weld metal Toughness (J) (vE-30° C.) |
|---|---|---|---|---|---|---|---|---|---|---|---|---|---|
| 1 | v | W1 | High | 10.6 | 7.3 | 24.7 | 100 | 0 | ○ | ○ | ○ | ○ | 21 |
| 2 | v | W2 | High | 9.1 | 7.5 | 26.1 | 85 | 15 | ○ | ○ | ○ | ○ | 45 |
| 3 | v | W3 | High | 7.7 | 7.3 | 27.6 | 85 | 15 | ○ | ○ | ○ | ○ | 41 |
| 4 | v | W4 | High | 6.1 | 7.1 | 29.3 | 80 | 20 | ○ | ○ | ○ | ○ | 65 |
| 5 | v | W5 | High | 4.2 | 7.5 | 31.7 | 60 | 40 | X | ○ | ○ | ○ | 79 |
| 6 | v | W6 | High | 1.6 | 7.7 | 26.1 | 85 | 15 | ○ | ○ | ○ | ○ | 88 |
| 7 | v | W7 | High | 4.2 | 7.3 | 28.5 | 80 | 20 | ○ | ○ | ○ | ○ | 76 |
| 8 | v | W8 | High | 5.6 | 7.7 | 29.9 | 75 | 25 | ○ | ○ | ○ | ○ | 71 |
| 9 | v | W9 | High | 7.0 | 6.8 | 30.5 | 65 | 35 | X | ○ | ○ | ○ | 47 |
| 10 | w | W10 | High | −4.7 | 7.5 | 22.5 | 98 | 0*6 | — | X | — | — | — |
| 11 | w | W10 | Low | −2.2 | 7.5 | 24.1 | 98 | 0*6 | — | X | — | — | — |
| 12 | v | W4 | Low | 5.1 | 3.3 | 29.7 | 80 | 20 | ○ | ○ | ○ | ○ | 23 |
| 13 | v | W6 | Low | −0.6 | 3.1 | 25.7 | 85 | 15 | ○ | ○ | ○ | X | 65 |
| 14 | v | W7 | Low | 2.5 | 2.9 | 28.6 | 75 | 25 | ○ | ○ | ○ | ○ | 59 |
| 15 | v | W8 | Low | 4.2 | 2.9 | 30.5 | 65 | 35 | X | ○ | ○ | ○ | 18 |
| 16 | v | W7 | Low | 0.4 | 0.9 | 29.6 | 70 | 30 | ○ | ○ | ○ | ○ | 45 |
| 17 | v | W11 | High | 3.9 | 5.3 | 27.9 | 85 | 15 | ○ | ○ | ○ | ○ | 65 |
| 18 | v | W11 | Low | 1.9 | 2.0 | 28.2 | 80 | 20 | ○ | ○ | ○ | ○ | 84 |
| 19 | v | W12 | High | 6.7 | 7.5 | 24.9 | 95 | 5 | ○ | ○ | X | ○ | 60 |

*1 The mark "—" indicates that the test was omitted.
*2 The mark ○ indicates that the result was good and X indicates that the result was poor.
*3 $f(5) = Cr + Mo - 1.7Ni$,
*4 $f(5') = 13 - 220 \times$ ○ (oxygen)
*5 $f(6) = Cr + Mo + 1.8Ni$
*6 Ferrite phase: 2%.

The specimens numbered 4, 6–8, 14 and 16–18, all satisfying the relations (5) and (6) defined by the present invention, gave good results in all characteristics, namely sour gas resistance, toughness, weld hot cracking resistance, workability and tensile properties. The specimen numbered 13, however, which satisfied the relations (5) and (6), was inferior in sour gas resistance since the Cr content was 10.4%, thus rather low. From this result, it was confirmed that for providing the weld metal with sour gas resistance, it is recommendable to increase the Cr content to 11% or above while satisfying the relations (5) and (6) simultaneously.

The specimens given other numbers than those mentioned above failed to satisfy at least one of the relations (5) and (6) and, except for specimen No. 5, they were poor in at least one of sour gas resistance and toughness. The specimen numbered 5, which was an example in which the austenite phase proportion in the weld metal portion was as high as 40% by volume, was good in sour gas resistance and toughness but too low in tensile strength.

The martensitic stainless steel welded pipe of the inventions is excellent in corrosion resistance of pipe inside surface weld portion, in particular in SCC resistance, in spite of its being a large-diameter, thick-wall welded pipe. Further, the sour gas resistance, toughness and weld hot cracking resistance can be improved by selecting the chemical composition. Therefore, it is very suited for use as a pipe for a pipeline for conveying a crude oil or natural gas highly corrosive to metals while omitting dehydration treatment.

What is claimed is:

1. A martensitic stainless steel welded pipe which comprises a base metal which is a stainless steel containing, on the mass % basis, not more than 0.05% of C and 9–20% of Cr and having a metallurgical microstructure comprising a full martensite phase or a martensite phase as the main constituent with a ferrite phase contained therein, and a seam weld metal which is a stainless steel containing, on the mass % basis, not more than 0.1% of C and 7–20% of Cr and having a metallurgical microstructure comprising a martensite phase as the main constituent with an austenite phase contained therein, a seam weld bead on the inside surface satisfying the following relation (1):

$$L \leq 0.2 \times W \quad (1)$$

where

L: the length of the portions of the seam weld bead which show a value of h exceeding 1.25 as calculated by the expression (2) shown below:

$$h = \{1 + (2 \times H/W)\} \times (YS_{B100}/YS_{w100}) \quad (2)$$

where

H: the height of the bead from the pipe inside surface (mm),

W: the width of the bead (mm), $YS_{B100}$: the yield strength of the base metal at 100° C. (MPa), $YS_{w100}$: the yield strength of the weld metal at 100° C. (MPa).

2. A welded pipe as claimed in claim 1, wherein the metallurgical microstructure of the base metal is constituted of, on the volume % basis, 55–90% martensite phase and 10–45% ferrite phase and that of the weld metal is constituted of, on the volume % basis, 70–95% martensite phase and 5–30% austenite phase, and wherein the chemical compositions of the base metal and weld metal are, on the mass % basis, as follows:

| Base metal: | Si: 0.01–1%, | sol. Al: 0.001–0.1%, |
|---|---|---|
| | Mn: 0.05–2%, | V: 0–0.5%, |
| | Ni: 0–9%, | Zr: 0–0.5%, |
| | Mo: 0–5%, | Ca: 0–0.05%, |
| | W: 0–6%, | Mg: 0–0.05%, |
| | Cu: 0–5%, | Ti: not more than 0.1%, |
| | | Balance: Fe, impurities; |
| Weld metal: | Si: 0.01–1%, | sol. Al: 0.001–0.1%, |
| | Mn: 0.05–2%, | V: 0–0.3%, |
| | Ni: 0–10%, | Zr: 0–0.3%, |
| | Mo: 0–5%, | Ca: 0–0.03%, |
| | W: 0–3%, | Mg: 0–0.03%, |
| | Cu: 0–3%, | Ti: not more than 0.1%, |
| | | Balance: Fe, impurities; | the contents of P, S and O (oxygen) among the impurities being, for both the base metal and weld metal, P: not more than 0.025%, S: not more than 0.01% and O: not more than 0.01%, and the content of N being not more than 0.02% for the base metal and not more than 0.05% for the weld metal.

3. A welded pipe as claimed in claim 1, wherein the contents of Cr, Ni and Ti in the base metal are, on the mass % basis, Cr: 11–% Ni: 3–7% and Ti: not more than 0.05%, with the following relations (3) and (4) being satisfied:

$$Cr+1.5Mo-Ni-0.4Cu-14 \geq 0 \quad (3)$$

$$Cr+1.5Mo-2Ni-0.8Cu-12.5 \leq 0 \quad (4).$$

4. A welded pipe as claimed in claim 1, wherein the contents of Cr, Ni, Mo and Ti in the base metal are, on the mass % basis, Cr: 15–20%, Ni: 4–7%, Mo:1.5–4% and Ti: not more than 0.015%, and the contents of Cr, Ni, Mo, W and Ti in the weld metal are, on the mass % basis, Cr: 11–18%, Ni:5–10%, Mo: 1.5–4%, W:0–4% and Ti: not more than 0.03%, with the chemical composition of the weld metal satisfying the following relations (5) and (6):

$$-1 \leq Cr+Mo-1.7Ni \leq 13-220 \times O \text{ (oxygen)} \quad (5)$$

$$25 \leq Cr+Mo+1.8Ni \leq 30 \quad (6).$$

5. A welded pipe as claimed in claim 1, wherein the contents of Cr, Ni, Mo and Ti in the base metal are, on the mass % basis, Cr:15–20%, Ni:4–7%, Mo:1.5–4% and Ti: not more than 0.015%, and the contents of Cr, Ni, Mo, W and Ti in the weld metal are, on the mass % basis, Cr:11–18%, Ni:5–10%, Mo:1.5–4%, W: 0.4% and Ti: not more than 0.03%, with the chemical composition of the base metal satisfying the following relations (3) and (4): and $$Cr+1.5Mo-Ni-0.4Cu-14 \leq 0 \quad (3)$$

$$Cr+1.5Mo31\ 2Ni-0.8Cu-12.5 \leq 0 \quad (4)$$

the chemical composition of the weld metal satisfying the following relations (5) and (6):

$$-1 \leq Cr+Mo-1.7Ni \leq 13-220 \times O \text{ (oxygen)} \quad (5)$$

$$25 \leq Cr+Mo+1.8Ni \leq 30 \quad (6).$$

6. A welded pipe as claimed in claim 1, wherein the base metal and the weld metal in the seam portion respectively have the following chemical compositions on the mass % basis:

| Base metal: | | |
|---|---|---|
| C: not more than 0.05%, | | Cu: 0–3%, |
| Si: not more than 0.5%, | | V: 0–0.3%, |
| Mn: not more than 1%, | | Ca: 0–0.01%, |
| Cr: 9–17%, | | Ti: not more than 0.1%, |
| Ni: 0–9%, | | Balance: Fe, impurities. |
| W: 0–1%, | | |
| Weld metal: | | |
| C: not more than 0.05%, | | Cu: 0–3%, |
| Si: not more than 0.5%, | | V: 0–0.2%, |
| Mn: not more than 1%, | | Ca: 0–0.01%, |
| Cr: 9–20%, | | B: 0–0.01%, |
| Ni: 0–9%, | | Ti: not more than 0.1%, |
| W: 0–3%, | | Balance: Fe, impurities. |

7. Use of a welded pipe as described in claim 1, in a line pipe for conveying a crude oil or natural gas with no dehydration treatment.

8. Use of a welded pipe as described in claim 3, in a line pipe for conveying a crude oil or natural gas with no dehydration treatment.

9. Use of a welded pipe as described in claim 5, in a line pipe for conveying a crude oil or natural gas with no dehydration treatment.

10. A welded pipe as claimed in claim 2, wherein the contents of Cr, Ni and Ti in the base metal are, on the mass % basis, Cr:11–20%, Ni:3–7% and Ti: not more than 0.05%, with the following relations (3) and (4) being satisfied:

$$Cr+1.5Mo-Ni-0.4Cu-14 \leq 0 \quad (3)$$

$$Cr+1.5Mo-2Ni-0.8Cu-12.5 \leq 0 \quad (4).$$

11. A welded pipe as claimed in claim 2, wherein the contents of Cr, Ni, Mo and Ti in the base metal are, on the mass % basis, Cr:15–20%, Ni:4–7%, Mo:1.5–4%, W:0–4% and Ti: not more than 0.03%, with the chemical composition of the weld metal satisfying the following relations (5) and (6):

$$-1 \leq Cr+Mo-1.7Ni \leq -\!\!-\!\!-220 \times O \text{ (oxygen)} \quad (5)$$

$$25 \leq Cr+Mo+1.8Ni \leq 30 \quad (6).$$

12. A welded pipe as claimed in claim 2, wherein the contents of Cr, Ni, Mo and Ti in the base metal are, on the mass % basis, Cr:15–20%, Ni:4–7%, Mo:1.5–4% and Ti: not more than 0.015%, and the contents of Cr, Ni, Mo, W and Ti in the weld metal are, on the mass % basis, Cr:11–18%, Ni:5–10%, W:0.4% and Ti: not more than 0.03%, with the chemical composition of the base metal satisfying the following relations (3) and (4): and $$Cr+1.5Mo-Ni-0.4Cu-14 \leq 0 \quad (3)$$

$$Cr+1.5Mo-2Ni-0.8Cu-12.5 \leq 0 \quad (4)$$

the chemical composition of the weld metal satisfying the following relations (5) and (6):

$$-1 \leq Cr+Mo-1.7Ni \leq 13-220 \times O \text{ (oxygen)} \quad (5)$$

$$25 \leq Cr+Mo+1.8Ni \leq 30 \quad (6).$$

13. A welded pipe as claimed in claim 2, wherein the base metal and the weld metal in the seam portion respectively have the following chemical compositions on the mass % basis:

| Base metal: | |
|---|---|
| C: not more than 0.05%, | Cu: 0–3%, |
| Si: not more than 0.5%, | V: 0–0.3%, |
| Mn: not more than 1%, | Ca: 0–0.01%, |
| Cr: 9–17%, | Ti: not more than 0.1%, |
| Ni: 0–9%, | Balance: Fe, impurities. |
| W: 0–1%, | |
| Weld metal: | |
| C: not more than 0.05%, | Cu: 0–3%, |
| Si: not more than 0.5%, | V: 0–0.2%, |
| Mn: not more than 1%, | Ca: 0–0.01%, |
| Cr: 9–20%, | B: 0–0.01%, |
| Ni: 0–9%, | Ti: not more than 0.1%, |
| W: 0–3%, | Balance: Fe, impurities. |

14. Use of a welded pipe as described in claim 2, in a line pipe for conveying a crude oil or natural gas with no dehydration treatment.

\* \* \* \* \*

UNITED STATES PATENT AND TRADEMARK OFFICE
CERTIFICATE OF CORRECTION

PATENT NO. : 6,379,821 B2
DATED : April 30, 2002
INVENTOR(S) : Kushida et al.

It is certified that error appears in the above-identified patent and that said Letters Patent is hereby corrected as shown below:

Column 7,
Line 3, "surf ace" should be -- surface --

Columns 19 and 20,
Table 3, "TS", "YS" and "YS" values of "Weld metal strength (Mpa)" insert -- 940 --, -- 670 -- and -- 570 -- respectively in the speciment No. 14
Table 3, Sour gas resistance of speciment No. 19, "O" should be -- – --

Column 31,
Line 25, "Cr:11-%" should be -- Cr:11-20% --
Line 46, "W:0.4%" should be -- W:0-4% --
Symbol of formula (3), "$\leqq$" should be -- $\geqq$ --
Formula (4), "1.5Mo31 2Ni" should be -- 1.5Mo—2Ni --
Formula 5, "—" should be -- - --

Column 32,
Symbol of formula (3), "$\leqq$" should be -- $\geqq$ --
Line 43, after "Mo:1.5-4%," insert -- and Ti: not more that 0.015%, and the contents of Cr, Ni, Mo, W and Ti in the weld metal are, on the mass % basis, Cr: 11-18%, Ni:5-10%, Mo:1.5-4% --
Formula (5), "$\leqq$—220 X O (oxygen)" should be -- $\leqq$13-220 X O (oxygen) --
Line 57, add -- Mo:1.5-4% --
Symbol of formula (3), "$\leqq$" should be -- $\geqq$ --

Signed and Sealed this

Twenty-fourth Day of June, 2003

JAMES E. ROGAN
*Director of the United States Patent and Trademark Office*